United States Patent [19]
Burgbacher

[11] Patent Number: 5,757,100
[45] Date of Patent: May 26, 1998

[54] METHOD & APPARATUS FOR REDUCING COGGING TORQUE IN AN ELECTRIC MOTOR

[75] Inventor: Martin Burgbacher, St. Georgen, Germany

[73] Assignee: Papst-Motoren GmbH & Co., Kg, St. Georgen, Germany

[21] Appl. No.: 699,516

[22] Filed: Aug. 21, 1996

[30] Foreign Application Priority Data

Aug. 28, 1995 [DE] Germany ............... 195 31 584.7

[51] Int. Cl.⁶ ..................... H02K 21/02; H02K 1/22
[52] U.S. Cl. ............... 310/186; 310/156; 310/187; 310/254; 29/596; 29/598
[58] Field of Search ................. 310/156, 154, 310/186, 187, 254; 29/596, 598

[56] References Cited

U.S. PATENT DOCUMENTS

| | | | |
|---|---|---|---|
| 4,280,072 | 7/1981 | Gotou et al. | 310/67 R |
| 4,737,674 | 4/1988 | Miyao | 310/268 |
| 4,739,203 | 4/1988 | Miyao et al. | 310/67 R |
| 4,755,701 | 7/1988 | Shikama | 310/156 |
| 4,874,975 | 10/1989 | Hertich | 310/186 |
| 5,128,575 | 7/1992 | Heidelberg et al. | 310/156 |
| 5,280,209 | 1/1994 | Leupold et al. | 310/156 |
| 5,331,245 | 7/1994 | Burgbacher et al. | 310/186 |
| 5,349,258 | 9/1994 | Leupold et al. | 310/154 |
| 5,610,464 | 3/1997 | Asano | 310/156 |

FOREIGN PATENT DOCUMENTS 0 647 010 B1  4/1995  European Pat. Off. .

*Primary Examiner*—Steven L. Stephan
*Assistant Examiner*—Michael J. Wallace, Jr.
*Attorney, Agent, or Firm*—Ware, Fressola, Van Der Sluys & Adolphson LLP; Milton Oliver

[57] ABSTRACT

Certain permanent-magnet-rotor electric motors exhibit an irregularity in their torque which is known as "cogging." The present invention creates at least one supplemental reluctance torque, and superimposes this supplemental reluctance torque on the cogging torque, in order to reduce or eliminate the effect of the cogging torque. Preferably, in the rotor, each boundary between north and south poles is subdivided into a plurality of parallel segments, some of which are angularly displaced with respect to others. Four different embodiments have different respective patterns of this displacement. These structures each result in production of a plurality of respective reluctance torques, which superpose and thereby substantially cancel each other. To minimize variation in the magnetically effective air gap, slot closures of ferromagnetic material may be provided. The dimensions of the air gap and of the auxiliary slots can be adjusted by grinding down or otherwise changing the air-gap-adjacent surface of the stator which faces the rotor, until a predetermined desired torque curve is achieved.

35 Claims, 15 Drawing Sheets

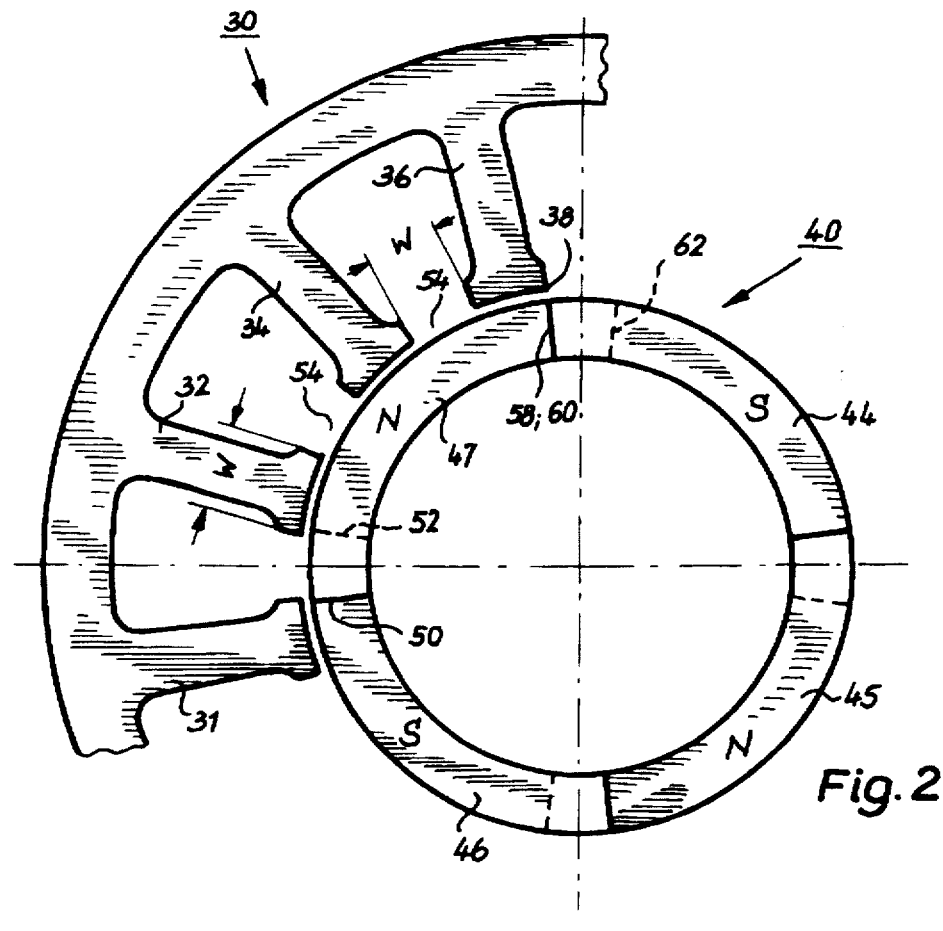
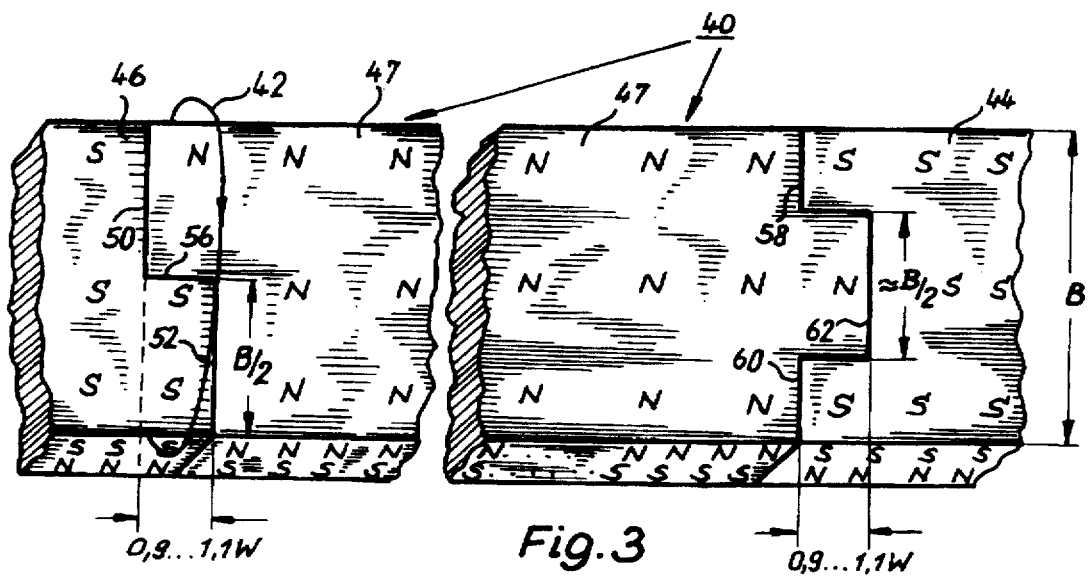
Fig. 2
Fig. 3

| | ① | ② | ③ | ④ | ⑤ | ⑥ | ① |
|---|---|---|---|---|---|---|---|
| T1 | ON | ON | OFF | OFF | OFF | OFF | ON |
| B1 | OFF | OFF | OFF | ON | ON | OFF | OFF |
| T2 | OFF | OFF | ON | ON | OFF | OFF | OFF |
| B2 | ON | OFF | OFF | OFF | OFF | ON | ON |
| T3 | OFF | OFF | OFF | OFF | ON | ON | OFF |
| B3 | OFF | ON | ON | OFF | OFF | OFF | OFF |

← 360°el →

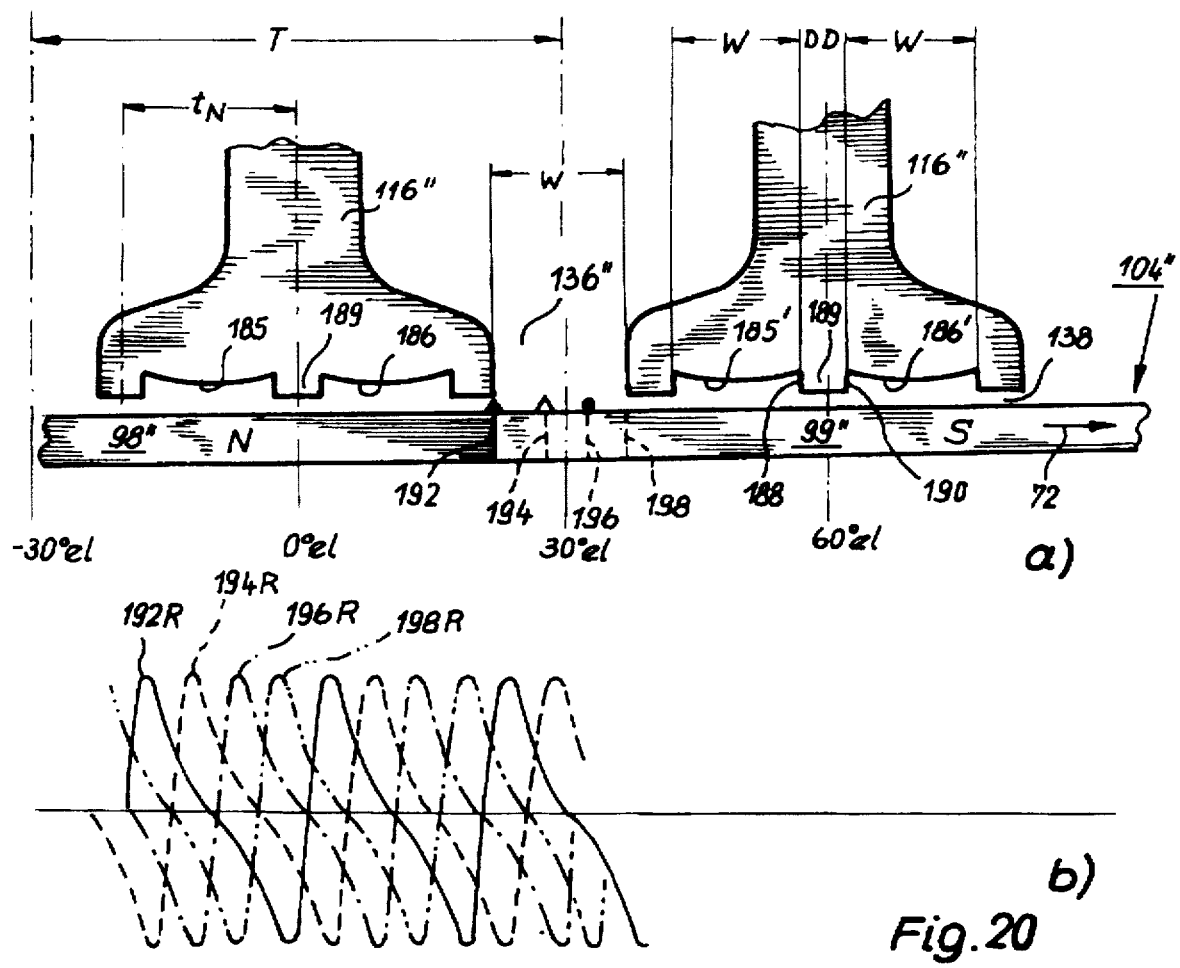
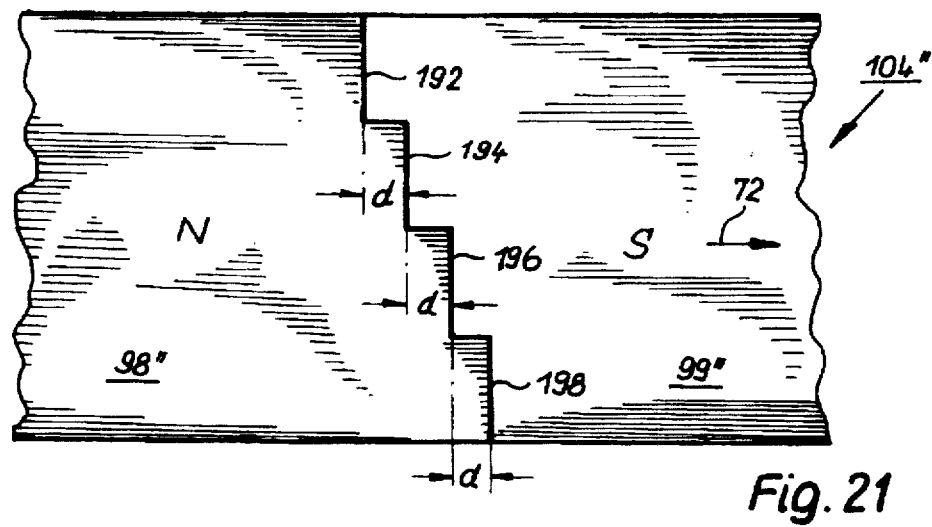
Fig. 20
Fig. 21

5,757,100

1
METHOD & APPARATUS FOR REDUCING COGGING TORQUE IN AN ELECTRIC MOTOR

FIELD OF THE INVENTION

The present invention relates generally to reduction of torque irregularities in permanent-magnet-rotor electric motors, and, more particularly, to a method and apparatus for reducing the irregularity known in the art as "cogging."

BACKGROUND

In electric motors having permanent magnet rotors, in which the magnetization pattern, i.e. the circumferential distribution of magnetic flux density $\beta$, deviates from a sinusoidal form, if one employs a stator formed with slot openings (the so-called "slotted stator"), the phenomenon occurs that the boundaries between the individual rotor poles seek the positions of the largest air gaps. To the observer, this has the appearance that the pole boundaries are attracted by the grooves of the stator and are "captured" by these slots. This effect is called "cogging" in English, and called "Nutrucken" in German.

This effect is generated by a so-called "reluctance torque," i.e. during turning of the rotor relative to the stator, in the magnetic circuit of the motor, energy is stored in certain rotation angle ranges of the motor, and in other rotation angle ranges, this magnetic energy is released. For storage, outside energy must be applied to the motor, i.e. the rotor is thereby braked, and conversely, the rotor is driven wherever energy is being released.

If one turns the rotor of such a motor by hand, one gets the impression that one "detects every slot."

In many driving applications, this reluctance torque is very disruptive, so that one is then forced to use iron-free stator windings, in which no reluctance torque occurs; however, the power output of such motors with iron-free stators is generally insufficient for the intended purpose. From German published patent application DE 17 63 769-A, SIEMENS, it is known to reduce cogging by providing additional recesses in the iron portions of the stator, which have the apparent effect of doubling the "slot count" of the stator. However, this achieves only a doubling of the frequency of the reluctance torque; its amplitude is not affected thereby.

This also applies, in the same manner, to the analogous solutions disclosed in U.S. Pat. No. 3,631,272 or FR 1,535,489, FIG. 1; only the frequency of the reluctance torque is increased, so that it can be more easily filtered out by corresponding damping elements.

SUMMARY OF THE INVENTION

It is therefore an object of the present invention, to provide a new method of reducing such a reluctance torque, and a corresponding new motor structure.

According to the invention, this object is attained by a method of reducing the reluctance torque known as "cogging" in a motor having a stator formed with slot openings and a permanent-magnet rotor. The distribution of magnetic flux density, in the circumferential direction, has a region of essentially constant magnetic flux density in a central region of a pole, the method having the following steps: (a) generating at least one supplemental reluctance torque in the motor; (b) superimposing this supplemental reluctance torque on the first reluctance torque, in order to reduce and/or eliminate the latter, at least in a region, through this superposition.

2

Similarly, this object is attained through use of an electronically commutated electric motor with a slotted stator and a permanent-magnet rotor, having the following characteristic features: each pole boundary between two adjacent rotor poles is subdivided into a plurality of pole boundary segments, spaced relative to each other; the interval of these pole boundary segments is so selected that a rotor part, provided with such pole boundary segments of a first kind, generates, in cooperation with the slotting of the stator, a first reluctance torque which runs essentially oppositely phased to a second reluctance torque which arises from a second rotor part, provided with pole boundary segments of a second kind, in cooperation with the slotting of the stator.

BRIEF FIGURE DESCRIPTION

Further details and advantageous refinements of the invention will be apparent from the embodiments described below and shown in the drawings, which are to be understood as exemplary but not limiting.

FIG. 2 shows a first embodiment of the invention in a broken-away view; the stator is, except for the form of the air-gap-adjacent teeth, structured the same as the stator of FIG. 5;

FIG. 3 shows two variants for the form of the pole boundaries of the magnets of rotor 40 of FIG. 1, in developed form;

FIG. 20 is a schematic diagram of a fourth embodiment, analogous to FIG. 4, FIG. 11, or FIG. 19 showing (a) pole schematic and (b) torque trace diagram which explains the operation of the motor;

FIG. 21 illustrates a pole boundary for the motor of FIG. 20; the three other pole boundaries, not shown, preferably have the same form;

DETAILED DESCRIPTION OF THE PREFERRED EMBODIMENTS

Figure 1:
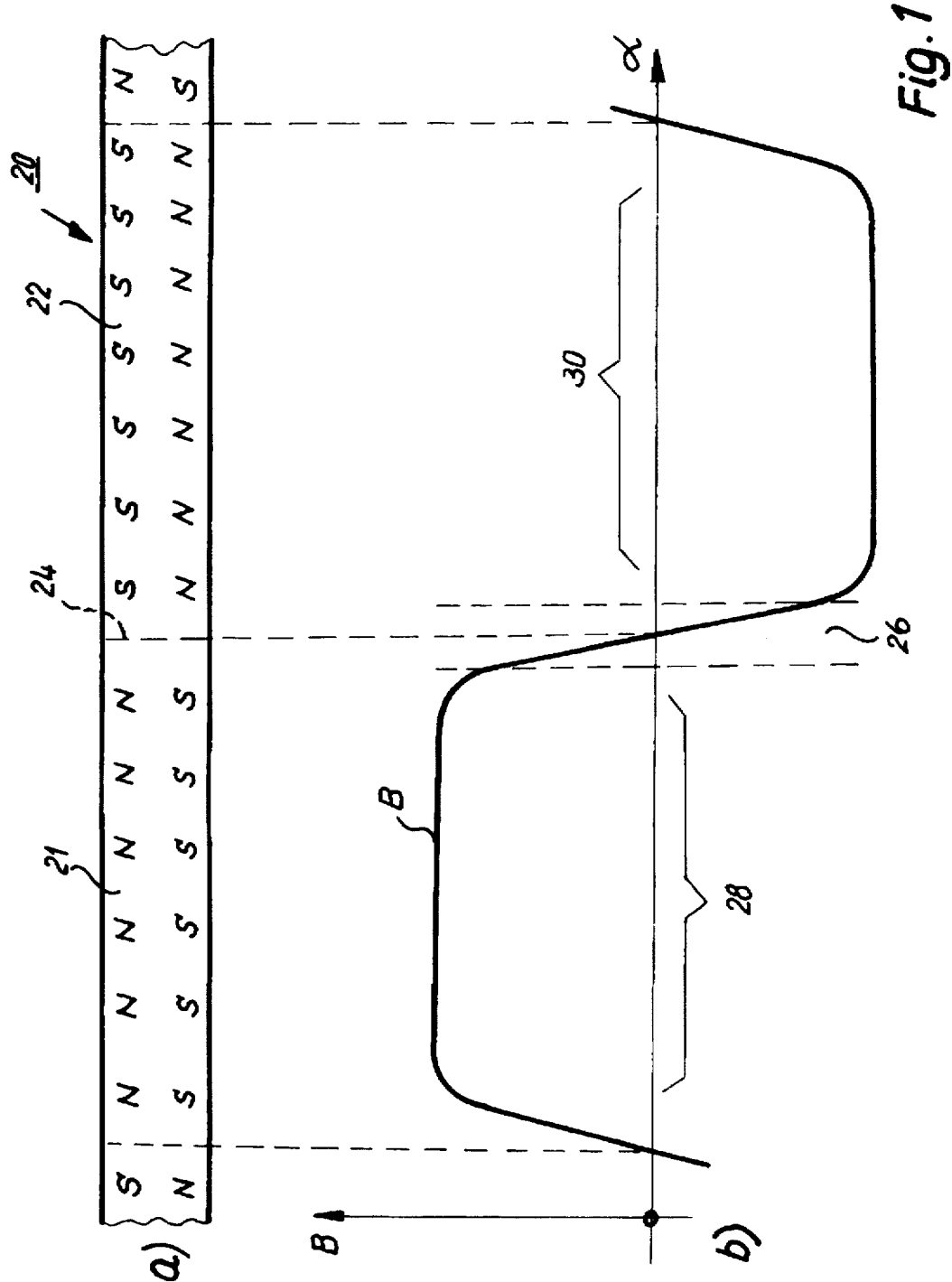
FIG. 1 is a schematic diagram showing (a) in developed form the magnetization of a rotor magnet and (b) its magnetic flux density $\beta$ measured in a circumferential direction; such a distribution is called a "trapezoidal" magnetization or sometimes also as "rectangular magnetization"

FIG. 1 shows, in a schematic and developed form, the magnetization of a rotor magnet 20. This rotor magnet has, on its upper surface, next to each other, a north pole 21 and a south pole 22. These poles 21, 22 are bounded, with respect to each other, by a pole boundary 24, at which the magnetic flux density $\beta=0$, as shown in FIG 1(b). Since the rotor magnet 20 frequently consists of a single piece, one can usually not see the pole boundary 24 with the unaided eye, but rather can see it only with the aid of special foils which make such boundaries visible. The rotor magnet 20 could, however, be assembled from different parts, and in that case, the pole boundary can be seen.

Such rotor magnet are frequently made of the so-called rare earths, e.g. samarium-cobalt alloy, or neodymium. They have a very high magnetic flux density $\beta$, and the form of their magnetic flux density is preferably, as shown in graph (b) of FIG. 1, essentially trapezoidal along its extent. Such a magnetization is sometimes also referred to as "rectangular," though a completely rectangular magnetization is not possible in practice. One strives, however, to make as narrow as possible the so-called "pole gap" 26, i.e. the region of the rotor where the transition from north pole to south pole (or vice versa) occurs, since this structure causes a motor, equipped with such a rotor magnet 20, to achieve its maximum output power.

This kind of magnetization is favorable for the efficiency of a motor, but motors, which are equipped with such highly permeable permanent magnets, are very sensitive to discontinuities on the stator side of the air gap. The user has the impression that the pole gaps 26 seek the positions of the stator, at which the air gap is at its maximum. One refers to this in German as "nutrucken", and in English as "cogging" or "cogging torque."

The impression, that the pole gaps 26 cause magnetic effects, is clearly incorrect, because the magnet is there very weak. The magnetic effects are instead mainly caused by those zones 28,30 of rotor magnet 20, at which the magnetic flux density $\beta$ is at maximum. However, for purposes of explanation, it is useful (albeit physically false) to consider the magnetic effects, which cause the cogging, with reference to the pole gap 26 or to the pole boundary 24.

This cogging is, in many applications, not acceptable and therefore such motors could hitherto only be used, in such applications, if they had an air gap substantially free of discontinuities. This applies particularly to motors which have a grooved stator and in which the number of stator teeth is divisible by the number of rotor poles without a remainder, e.g. twelve stator teeth and four rotor poles. The quotient 12:4 equals 3, and such motors with integer quotient values are particularly susceptible to cogging.

FIG. 2 shows a portion of a motor of the invention, with reference to which the basic principles of the present invention will be explained. Of the stator 30 of this motor, only about a quarter is shown, namely only four of the total twelve stator teeth, in the form of stator teeth 31, 32, 34, 36, which are separated by an air gap 38 from a four-pole magnetized rotor 40, whose form of magnetization has special characteristics, shown in FIG. 3.

FIG. 3 depicts two alternative embodiments, one of which is shown at left, the other at right. According to the left alternative, there arises an axial force on rotor magnet 40, which causes additional noise. According to the right alternative, this axial force does not arise, and therefore the right alternative is preferred.

According to FIG. 2, rotor 40 has four poles 44, 45, 46 and 47, which are magnetized trapezoidally, according to FIG. 1. FIG. 3 shows, in developed form, the poles 44, 46, and 47 and the pole boundaries therebetween.

As shown in FIG. 3, rotor magnet 40 has a breadth B, and the pole boundary between the south pole 46 and the north pole 47 has an upper segment 50 (shown at top left) which extends for about B/2, half the rotor breadth, and parallel to the slot teeth 31, 32, etc. Further, this pole boundary has a lower segment 52 (shown at bottom left) which also extends for about B/2 and is parallel to upper segment 50, but is circumferentially displaced with respect thereto.

As FIG. 2 shows, in stator 30, the groove slots or openings 54 have the width W and the stator teeth 31, 32, 34, 36 also have this width W, on their side facing rotor 40. The segments 50, 52, in this embodiment, are displaced with respect to each other by approximately this width W, i.e. by somewhere in the range from 0.9 W to 1.1 W. The same applies for the three other pole boundaries, not shown, of this rotor 40.

As one recognizes in FIG. 3, this form of pole boundary 50, 52 has the effect that a segment 56 of the pole boundary jogs over, substantially in the circumferential direction of rotor 40, and this jog connects segments 50 and 52 with each other. In practice, this segment 56 generally runs diagonally, as shown in subsequent figures, since it is generated by a corresponding magnetizing apparatus, whose construction is familiar to those skilled in the art. Normal to this segment 56, there runs a stray flux 42 which weakens rotor magnet 40. Therefore, it is important, to keep this segment 56 as short as possible. The following examples show how one can achieve this goal.

In the variant illustrated in the right portion of FIG. 3, there is a segment 58 of the pole boundary which extends for about 25% of pole breadth B, and likewise, below, a segment 60 of the pole boundary which is aligned with segment 58 and which also extends for about 25% of pole breadth B. Further, in the middle, there is a segment 62, which can have about length B/2 (usually somewhat less, since rotor magnet 40 is at its strongest in the middle). This segment 62 is displaced, with respect to segments 58 and 60, by a predetermined distance, namely 0.9 W to 1.1 W, as shown in FIG. 3. One would preferably form the pole boundaries between all four poles of rotor 40 symmetrically, according to these pole boundaries 58, 60, 62, whereby the pole boundary assumes approximately the form of an arrow. This has the advantage that no axial force on rotor 40 is generated, while the form of pole boundary 50, 52 does generate an axial force on rotor 40, when rotor 40 is within a stator 30.

As one gathers from FIG. 3, it is only significant that one has pole boundary segments with particular length relationships, which are displaced with respect to each other by predetermined amounts. Specifically how these boundary segments are arranged next to each other can have additional advantages, but is without substantial importance for the reduction of cogging torque.

Figure 4:
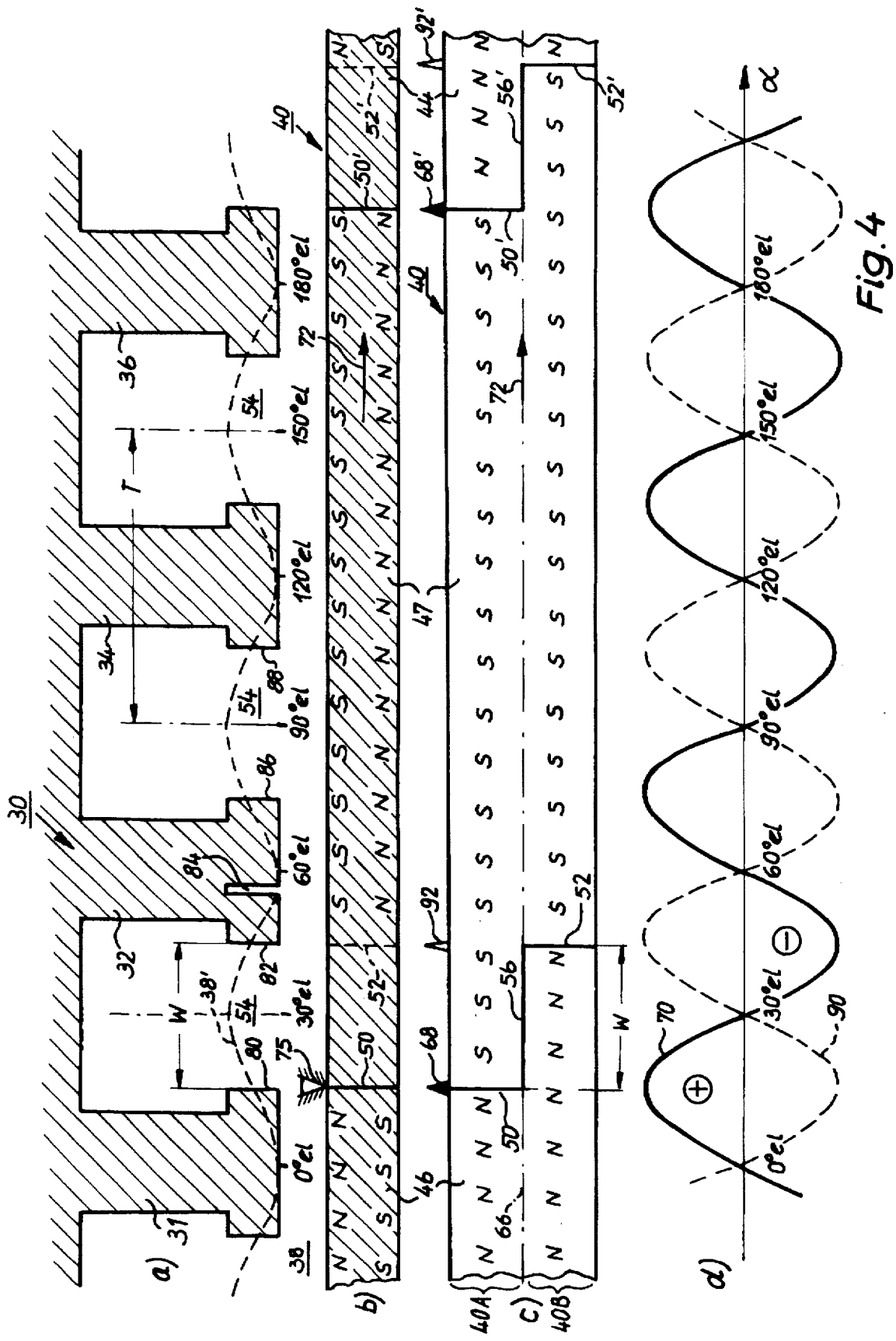
FIG. 4 is a developed representation of the rotor of FIG. 1, together with curves explaining its mode of operation.
Figure 5:
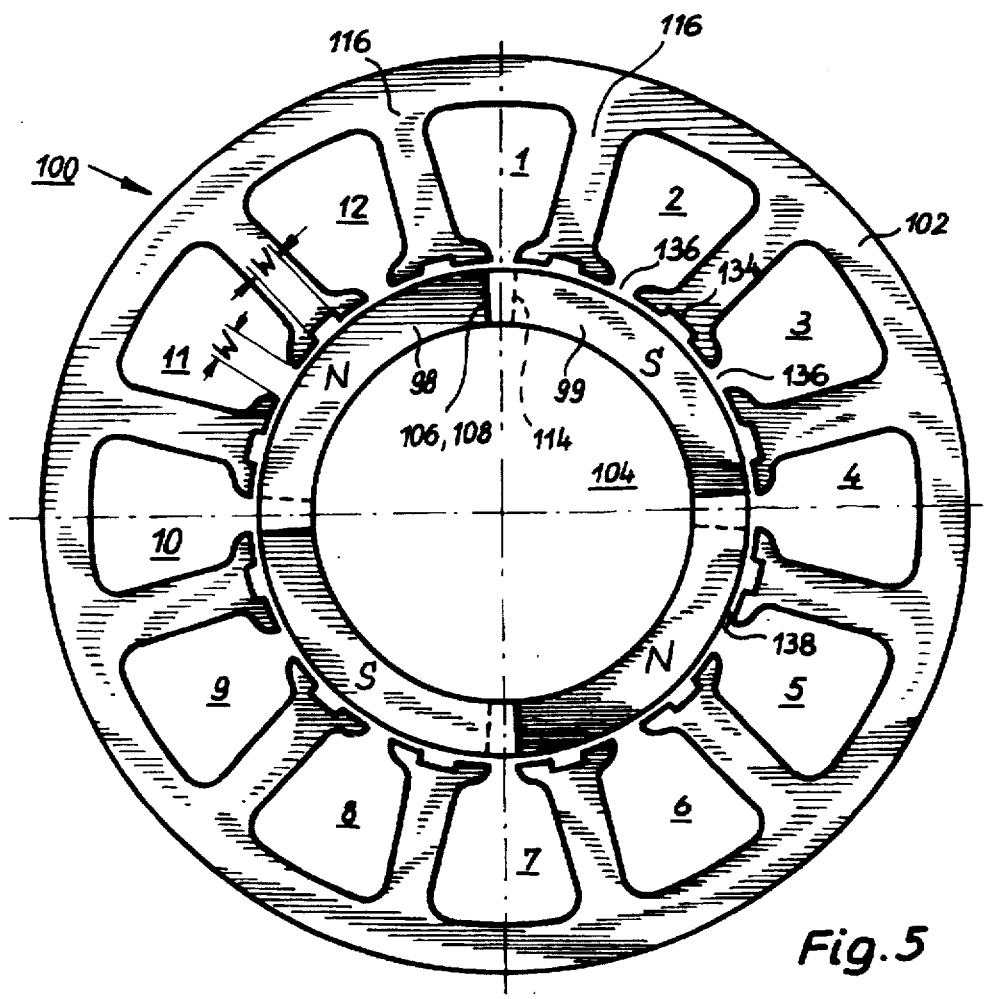
FIG. 5 shows a second embodiment of the invention.

FIG. 4's structure schematics (a), (b), (c) and aligned graph (d) serve to explain the invention. This shows a portion of the motor, developed, namely: in FIG. 4(a), the stator with four teeth 31, 32, 34, 36, and thereunder in FIG. 4(b) the rotor magnet 40 in a side view, and in FIG. 4(c) the rotor magnet 40 in a plan view, i.e. on its side facing the air gap 38. Graph (d) shows the so-called reluctance torques which arise whenever rotor 40 is turned, e.g. manually, or by a machine, or during operation of the motor.

The pole boundaries of FIG. 4(c) correspond to the left example of FIG. 3, i.e. with pole boundary segments 50, 52, 56, and therefore in FIG. 4(c), right, the pole boundary segments are designated 50', 52', and 56'. The function is easier to explain and understand with reference to this form of the pole boundaries. This form of the pole boundaries is therefore shown here for didactic reasons, although it has the result of an undesired axial force on the rotor.

For purposes of explanation, it is useful to think of rotor 40 as divided, along a longitudinal axis 66 (FIG. 4c) into two separate rotor halves, which interact with stator 30 in different respective ways. In FIG. 4(c), the upper rotor half is therefore designated 40A, the lower rotor half 40B.

Initially, upper rotor half 40A will be described. Its pole boundaries 50, 50' are visually indicated by black triangles 68, 68'. If rotor 40 is so positioned that black triangle 68 is aligned with the positions 0° electrical (FIG. 4a), 30° el., 60° el., 90° el. etc. of stator 30, no reluctance torque is exerted at this position on rotor magnet 40A, since this stands symmetrically to stator 30 and thus exactly the same magnetic forces in the advancing direction, as in the retarding direction, are exerted on it, when it finds itself in one of these positions. Therefore, in these positions 0° el., 30° el., etc., the reluctance torque 70, which is shown in FIG. 4d and acts upon rotor half 40A, has the value zero, which results directly from the symmetry of the arrangement and which is readily apparent.

If one turns rotor half 40A in the rotational direction shown by arrow 72 (FIGS. 40b, 40c), e.g. from 0° el. to the position shown in FIG. 4 (15° el.), a driving, positive part of reluctance torque 70 is exerted on rotor half 40A, and this reluctance torque has approximately the form shown in FIG. 4d. As a mental crutch, one can imagine that pole boundary 50 seeks to go into the position 30° el. (or 90° el. or 150° el. etc.) in which the adjacent air gap 38 is at its largest value.

It is useful, purely for better visualization, to imagine a myopic eye 75 (FIG. 4b) at pole boundary 50. In the position illustrated (15° el.), this eye 75 "sees" to the left the iron of tooth 31, and, to the right, the slot opening 54, i.e. air. For this hypothetical eye 75, iron and air "blur together" into a kind of "attenuated iron", or, in other words, instead of the actual air gap 38, this myopic eye 75 sees a "magnetically effective air gap" 38' which is indicated in FIG. 4a by the dashed wavy line. This magnetically effective air gap 38' determines the form of the reluctance torque 70 for upper rotor half 40A.

If upper rotor half 40A is now further rotated beyond the 30° el. position, the black triangle 68 leaves the maximum of the magnetically effective air gap 38', i.e. this becomes smaller again, which means that rotor half 40A is braked or retarded by a negative reluctance torque, as indicated by curve 70 going negative in the FIG. 4(d) graph.

One also recognizes that the (positive or negative) maximum of the reluctance torque 70 always especially coincides with the side edge of a slot opening 54, i.e. for the observer, it appears that these edges cause the "cogging."

These side edges do cause a sharp discontinuity of the (actual) air gap curve 38 and indeed, as a example, with respect to the direction of rotation 72, at the right edge 80 of tooth 31, air gap 38 becomes suddenly very much larger; therefore, this kind of discontinuity is referred to hereinafter as a "positive discontinuity." Conversely, at the left edge 82 of tooth 32, air gap 38 becomes suddenly very much smaller; therefore, this kind is discontinuity is referred to as a "negative discontinuity."

For these discontinuities to have an influence on the reluctance torque 70, and thus to be relevant for it, they must have a predetermined interval or spacing from one another. For example, purely for didactic reasons, a narrow slot 84 is shown in tooth 32. This slot 84 indeed represents a positive and a negative discontinuity of air gap 38, but is practically without influence on the reluctance torque 70. One can mentally picture the myopic eye 75 completely overlooking this narrow slot because it is so narrow. Therefore, it is not relevant to the reluctance torque.

The next magnetically relevant discontinuity in FIG. 4 is the right edge 86 of tooth 32, thereafter the left edge 88 of tooth 34, etc.

According to this embodiment, the "Discontinuity Distance" DD from the positive discontinuity 80 to the negative discontinuity 82 has the value W, as does the DD from negative discontinuity 82 to the next positive discontinuity 86, since the slot spacing T in this embodiment has the value 2 W. In this case, the pole boundaries 50 and 52 are displaced with respect to each other by about the value W, as shown in FIG. 4c, i.e. by about the smallest DD.

This has the consequence that the lower half 40B of rotor 40 generates a reluctance torque which runs in phase opposition to reluctance torque 70, but—due to the symmetry of the design—has practically the identical form as reluctance torque 70 so that the reluctance torques 70 and 90 will essentially cancel each other. In practice, in this manner, the cogging can be largely alleviated or cancelled.

FIG. 4c designates the pole boundaries 52, 52' with open triangles 92 and 92' and one recognizes that their symmetrical positions with respect to stator 30, i.e. 0° el., 30° el., etc., correspond to the symmetrical positions of black triangles 68, 68', since, for example, the triangles 68 and 92 have a spacing of 30° el. (45°–15°) with respect to each other, which corresponds to an interval of two symmetry positions. This results in the phase opposition of curves 70 and 90.

The embodiment of FIGS. 2 through 4 is, due to the unfavorable size of slot openings 54, not very practical; i.e. such a motor would have too large an air gap and thus poor efficiency. It was mainly illustrated in order to permit explanation of the invention by reference to a relatively simple variant. The following embodiments permit reduced slot openings, which corresponds better to the practical requirements of electrical motor engineering, but they involve similar considerations and design principles, as were explained above in detail, referring to FIGS. 2–4, in order to facilitate understanding of the invention.

SECOND EMBODIMENT

Figure 6:
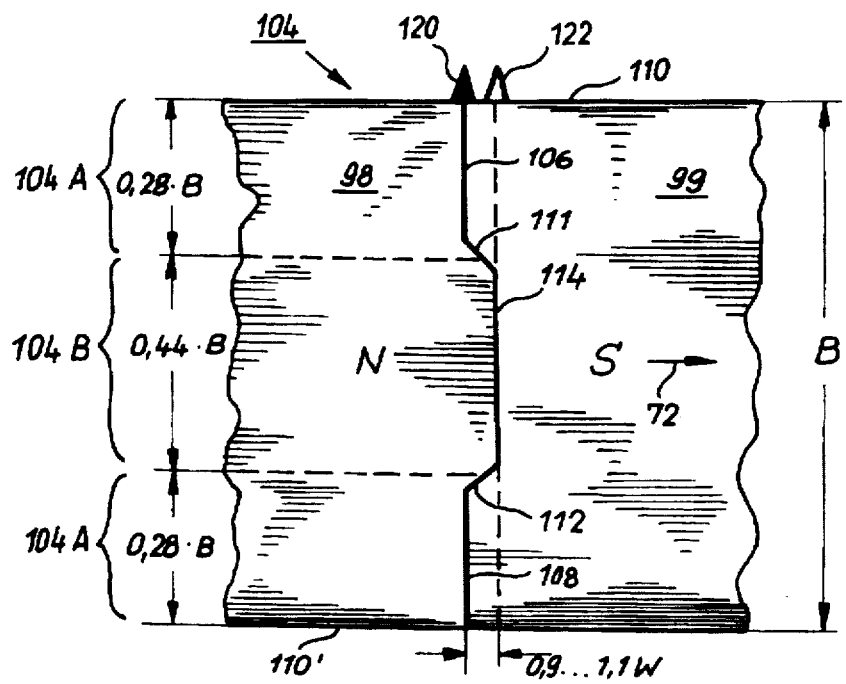
FIG. 6 illustrates a pole boundary for the motor of FIG. 5; the three other pole boundaries are preferably formed in the same way.

FIGS. 5–15 relate to a second, preferred, embodiment of the invention. This motor 100, an electronically-commutated internal rotor motor, has a stator 102 with twelve slots, designated 1 through 12, and a rotor 104 with four poles, constructed essentially the same as the rotor 40 already described in detail with reference to FIGS. 1–4. FIG. 6 illustrates the form of a pole boundary between two adjacent rotor poles 98, 99. This pole boundary has two segments 106 and 108 which are aligned with each other and extend from outer rims 110, 110' of the rotor magnet orthogonally inwardly, i.e. parallel to slots 1–12 of stator 102. Diagonally extending connecting segments 111 and 112 connect end segments 106, 108 of the boundary to a central segment 114 of the pole boundary, which is parallel to segments 106, 108 but displaced from them by a distance in the range 0.9 W to 1.1 W. Due to the higher magnetic flux density in the central region of rotor 104, the central segment has a length of only about 44% of rotor breadth B, and the segments 106, 108 thus collectively have a length of about 56%. of the rotor breadth (neglecting the insubstantial length of segments 111–112), as shown in FIG. 6. The exact ratio, which here approximates 56 to 44, must be determined by routine experimentation for the specific motor.

Analogously to FIG. 4c, one can think of rotor magnet 104 as separated into two magnets:

first, the two outermost portions 104A collectively as a single rotor magnet 104A, the two pole boundaries 106, 108 being aligned, i.e. being co-linear, and second, the central portion 104B with its displaced pole boundary 114.

Figure 11:
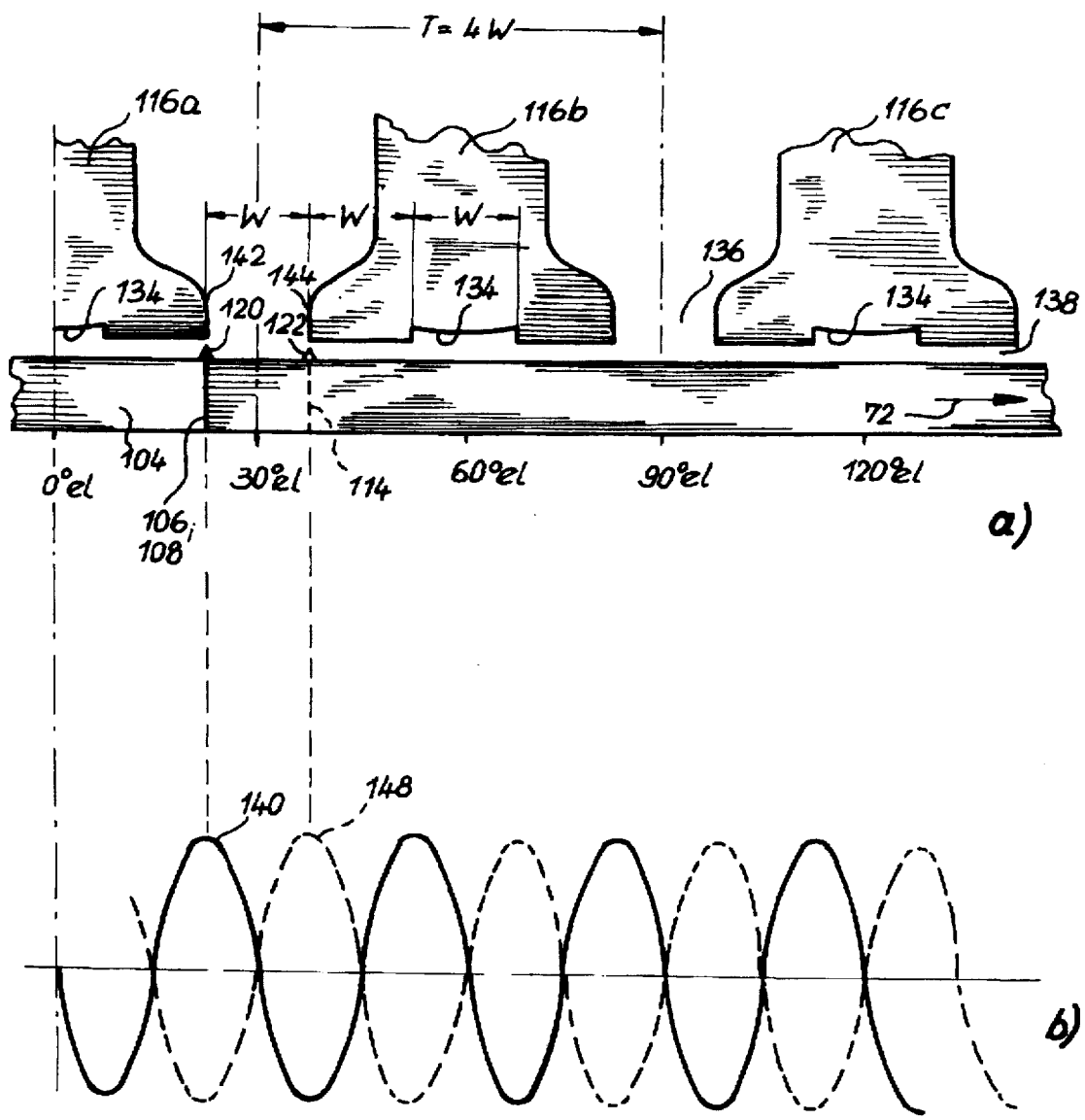
FIG. 11 is a combination 11(a) pole schematic and 11(b) torque trace diagram which explains the operation of the motor of FIG. 5.

The pole boundaries 106, 108 are marked in FIGS. 6 & 11 by a black triangle 120, and pole boundary 114 is marked by an open triangle 122. In this embodiment, the interval between triangles 120, 122 is, as previously noted, about 0.9 W to 1.1, where W is defined as the width of a slot opening and corresponds to about 15° el.; see FIG. 11A.

Figure 7:
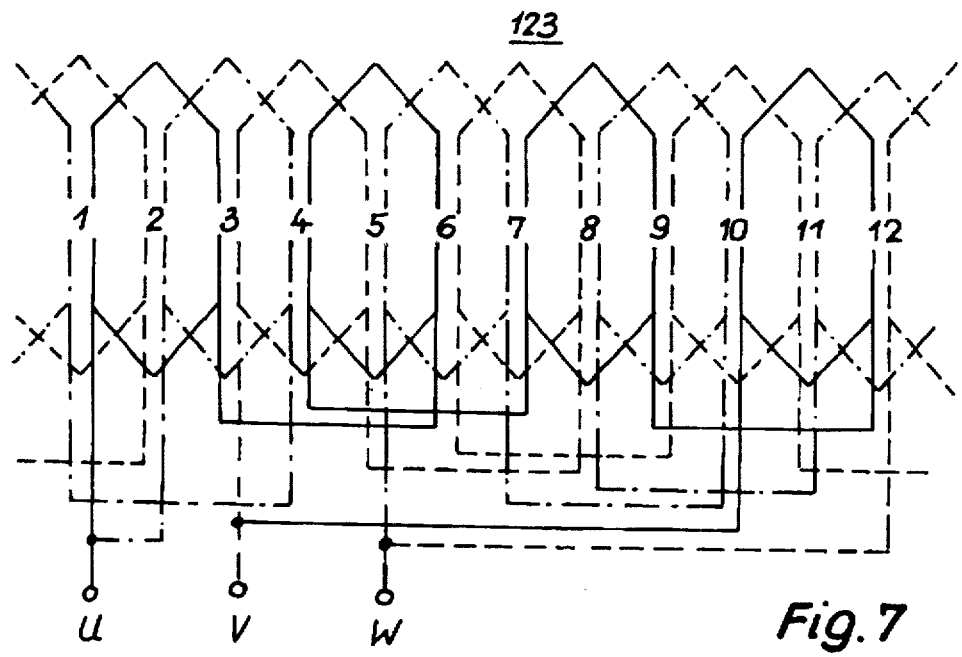
FIG. 7 illustrates a pitched, three-stranded stator winding, as could be used in the motor of FIG. 5 (or of FIG. 1, or of FIGS. 16 and 20)

FIG. 7 illustrates a three-stranded winding 123, for stator 102, which is delta-connected. The terminals of the delta or triangle circuit are designated in the usual manner as U, V & W. The windings in slots 1–12 are shown schematically, in the manner standard in electro-motor engineering. As one recognizes, the coils of each individual strand extend over only 120° el., i.e. the winding 123 is steeply pitched. This is desirable in a delta or triangle circuit, in order, by this means, to suppress the 3rd harmonic of the induced voltage (the so-called "back-EMF"). A "pitched" winding has a coil width—here 120° el.—which is smaller than a pole division, i.e. smaller than 180° el.

Instead of a delta circuit structure, a star structure would clearly also be possible. Equally, the invention could be used for other strand counts or numbers of phases, as the foregoing description clearly indicates.

Figure 8:
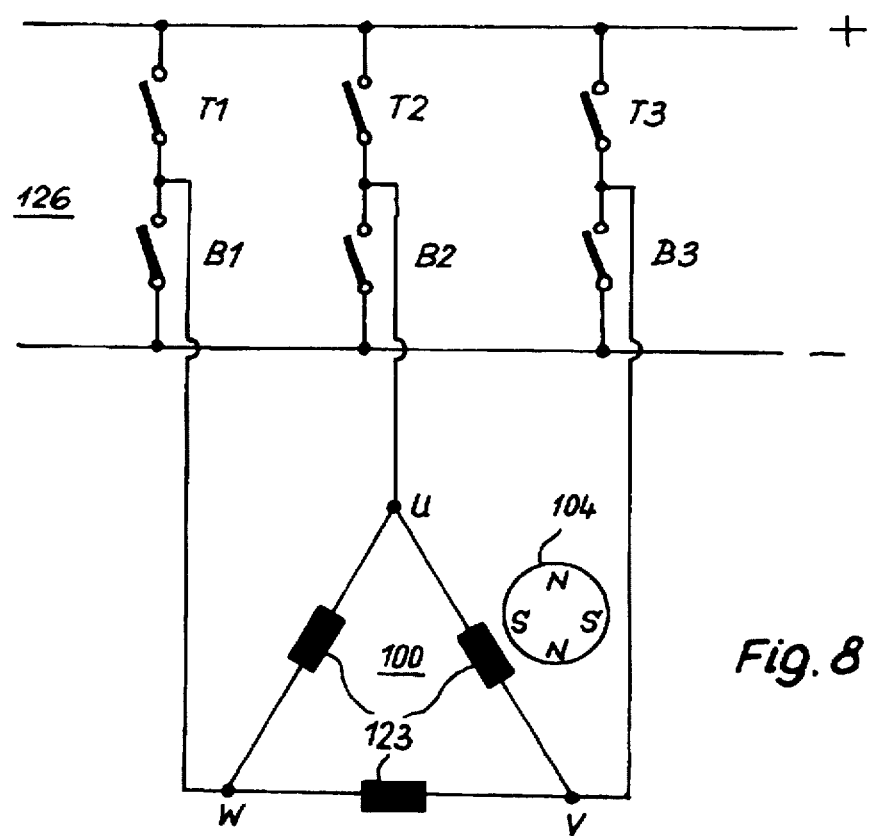
FIG. 8 is a schematic view of a full bridge circuit for operation of the motor according to FIGS. 1, 5, 16, or 20.

FIG. 8 illustrates the connection of terminals of windings U, V, W using a full-bridge circuit 126, whose six semiconductor switches T1, T2, T3, B1, B2, B3 are only symbolically represented. These are turned OFF and ON as a function of rotational position of rotor 104.

Figures 9, 10:
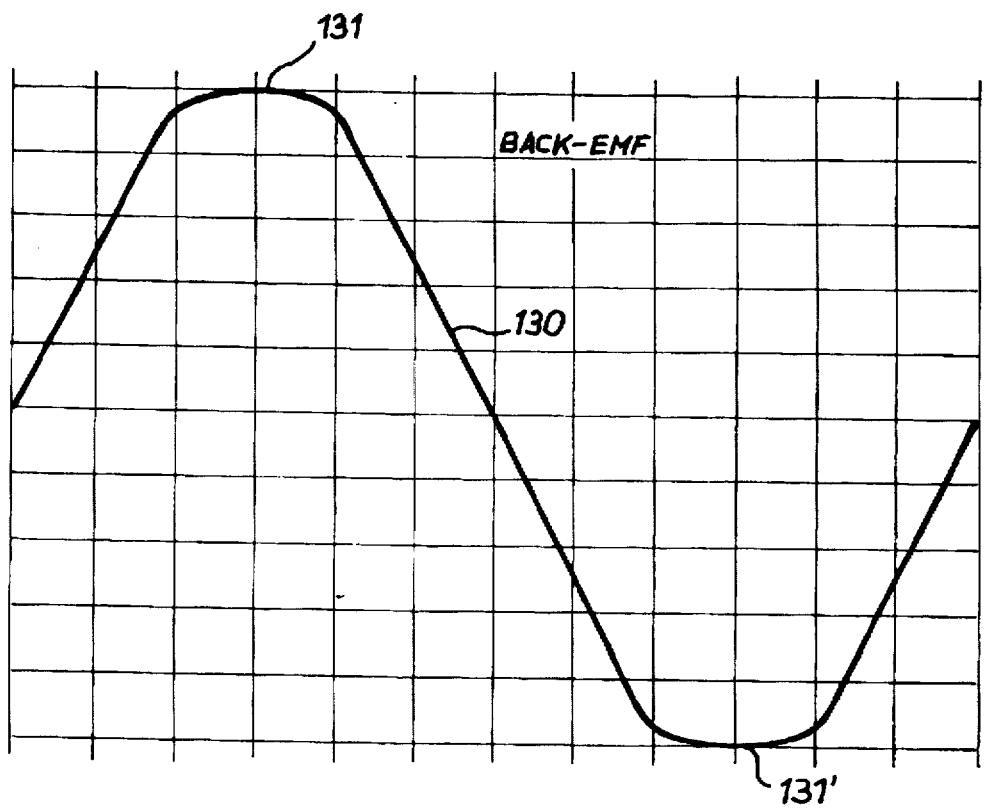
FIG. 9 illustrates the commutation sequence for the full bridge circuit of FIG. 8.
FIG. 10 illustrates a typical induced voltage, measured in a motor with a pitched winding according to FIG. 7.

FIG. 9 is a table showing an exemplary commutation sequence for a rotation through 360° el. and a predetermined rotation direction. ON means the respective switch is closed (conductive) and OFF means the respective switch is open (non-conductive). In this example, after each rotation of rotor 104 through 30° el., the commutation switch states change. Control of the commutation can be provided by three Hall generator sensors (not shown) or the rotor position can be communicated according to the so-called "sensor-less principle" described in EP 0 536 113 B1, VON DER HEIDE+/PAPST. These details are not illustrated because they are not needed for an understanding of the present invention, and are familiar to those of ordinary skill in the electronically commutated motor art.

FIG. 10 illustrates the curve 130 of the voltage between points U & V (FIGS. 7–8) which one obtains, if one drives rotor 104 mechanically, i.e. operates it as a generator. One refers to this voltage, which also occurs during motor operation, as "back-EMF" or "counter-EMF", or also as "induced voltage." One recognizes that this voltage 130 has an essentially trapezoidal waveform, corresponding to the trapezoidal magnetization of rotor 104. The use of auxiliary slots 134, shown in FIG. 11a, results in a voltage form or trace which resembles a sinewave somewhat more, and which has a pip or flattened-off bump 131, 131' at top and bottom. Since the winding 123 is, as previously described, steeply pitched, the induced voltage is here not a perfect reflection of the magnetization of the rotor, because this kind of winding is intended to suppress certain overtones or harmonics in voltage 130. A full-pitch winding would better reproduce the form of the magnetization of rotor 104, i.e. the flanks or edges of the voltage would be steeper.

Figure 13:
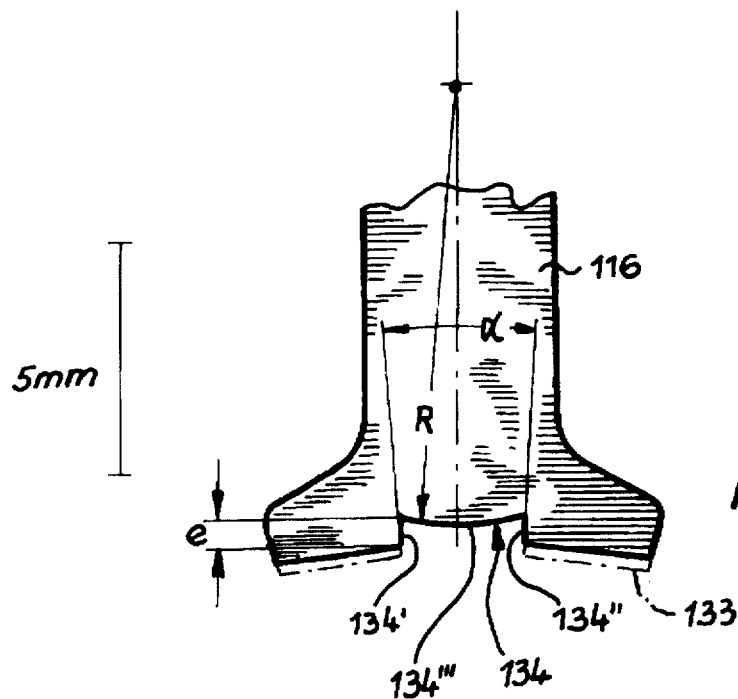
FIG. 13 is a greatly enlarged view of a stator tooth, formed with an auxiliary slot, in the motor according to FIG. 5.

The teeth 116 of stator 102 each have, in their centers, a very shallow auxiliary slot 134, which has about the same width W as the slot openings 136; see FIG. 13. The slot interval T of the primary slots 1–12, provided for the windings, has here the value 4 W where 720° el.+12=60° el., and the slot openings 136 are significantly narrower than in the first embodiment, namely only 15° el.

When one considers collectively the twelve slots 1–12 provided for the windings and the twelve auxiliary slots 134, one has in total 24 slots, evenly distributed around the stator circumference, which determine the form of the air gap and whose slot interval approximates 720° el.+24=30° el. As one recognizes, the displacement from pole boundaries 106, 108 to pole boundary 114 is about half this 30°, namely about 15° el.

In the first embodiment, the displacement of the pole boundaries 50, 52 was there about 30° el., namely half of the slot interval of 60° el. there. A preferred value for the displacement of the pole boundaries is therefore half a slot interval, the auxiliary slots 134, if any, being considered in the calculation. With this value of displacement, there result two oppositely-phased reluctance torques, which, if correctly arranged, substantially cancel each other, and thereby suppress the cogging or at least substantially reduce it.

Further below, another embodiment will be described in which one can, by means of three displaced pole boundaries, each displaced with respect to each other by a third of a slot interval, also achieve a suppression of cogging.

As shown in FIG. 13, where for comparison purposes a scale 5 mm long is provided, auxiliary slots 134 have an angular extent alpha, which in this example approximates 15.2° el., corresponding to a width of about 2 mm. In this example, the depth e of such an auxiliary slot 134 approximates 0.55 mm at its left edge 134' and the same at its right edge 134", i.e. these auxiliary slots are very shallow. Between these edges, the depth lessens, i.e. the connecting portion 134''' between the edges is bowed, e.g. with a radius R of 8 mm. The cross-section is thus essentially lens-shaped, i.e. it presents a convex surface to the air gap. This has the advantage, among others, that this auxiliary slot does not significantly increase the average value of the air gap, which is favorable for the power and efficiency of the motor.

FIG. 13 also shows how one can optimize the motor. Here, the stator laminations, with their teeth 116, have initially an overly small inner diameter, indicated by the dashed line 133. With these—overlarge—stator laminations, implying that the auxiliary slot 134 is too deep, leading to a correspondingly large reluctance torque, the reluctance torque of the motor is measured, as shown for example in FIG. 14.

Figure 14:
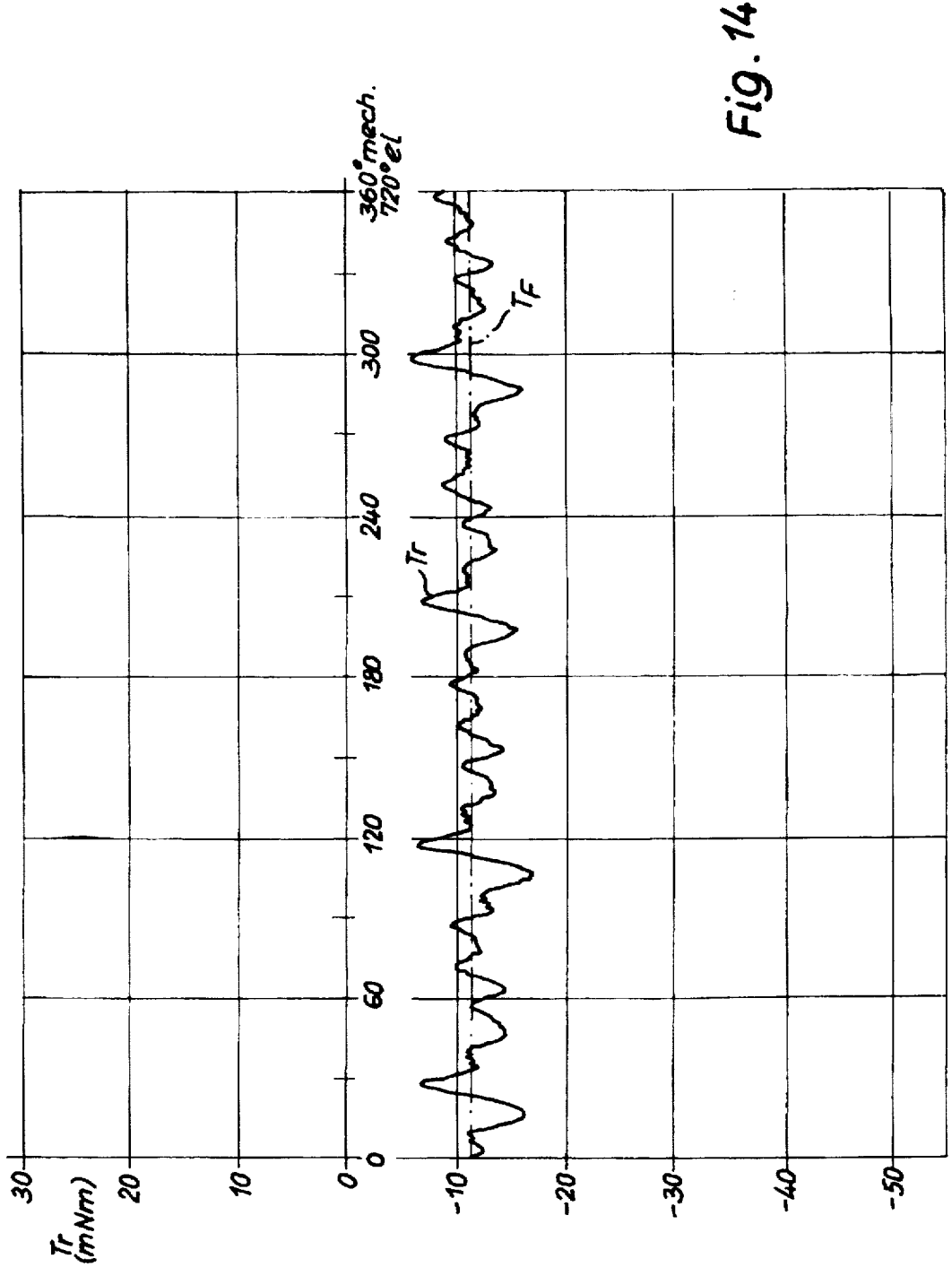
FIG. 14 illustrates the measured residual reluctance torque in the motor according to FIG. 5.

FIG. 14 shows the trace of this reluctance torque or torque over a full rotation of 360° mech.=720° el. The measurement also detects the friction torque TF of the motor, here for example about 11.4 mNm on average, which superimposes over the reluctance torque, to produce a measured resulting torque $T_r$ whose alternating component oscillates in the range of about ±5 mNm (milli-Newton-meters), i.e. in the optimum state is very small.

After this measurement, the inner diameter of this stator lamination stack 102 (FIG. 5) is made larger, by grinding, or turning the stack on a lathe. Thereby, the depth of auxiliary slots 134 is reduced, along with the reluctance torque which they create. With this altered stator lamination packet 102 (corresponding to the continuous line in FIG. 13), the curve of FIG. 14 is measured anew, and one observes whether the result has been improved. In this manner, one can optimize the motor very simply in the laboratory, i.e. determine the optimal depth e of auxiliary slots 134, and this optimal depth is then used for the manufacture of the motor.

FIG. 14 was measured for such an optimized motor, and FIG. 13 illustrates a tooth 116 of this optimized motor. Here, e=0.55 mm, R=8 mm, and alpha=15.2° el.

MODE OF OPERATION OF THE SECOND EMBODIMENT

The mode of operation of the second embodiment can best be explained by reference to FIG. 11. As one observes the black arrow 120, which symbolizes the rotor half 104A, one recognizes that it has symmetry positions at the positions 0° el., 30° el., 60° el., etc., i.e. in these positions the reluctance torque 140, (see FIG. 11b) which acts upon rotor half 104A, has the value 0.

A similar symmetry position for the rotor half 104A results at about 15° el., 45° el., 75° el., 105° el, etc., i.e. there also, the reluctance torque has the value 0.

If one turns rotor half 104A in the direction of arrow 72, so that black triangle 120 moves from 0° el. to 15° el., for this purpose a driving torque is necessary, i.e. the reluctance torque is negative here because the magnetically effective air gap decreases in the region of the pole boundaries. If one turns further from 15° el. to 30° el., one obtains—due to the increase in magnetically effective air gap—a driving reluctance torque there, where the pole boundaries 106, 108 rotate past the right edge 142 of tooth 116a forming there a positive discontinuity.

If one turns rotor half 104A from position 30° el. to position 45° el., one must overcome a braking or retarding reluctance torque 140, whose maximum approximately coincides with the left edge 144 of tooth 116b, forming there a negative discontinuity. The rest of the curve is shown in FIG. 11b.

The rotor half 104B is symbolized by the open triangle 122, which is displaced relative to black triangle 120 by about 15° el., i.e. rotor half 104B generates a reluctance torque 148 which is displaced by about this angle, and is indicated by the dashed line in FIG. 11b. The form of reluctance torque 148 is generally identical to the form of reluctance torque 140, which directly results from the geometry of the motor.

As one recognizes from FIG. 11b, the reluctance torques 140, 148 are essentially in phase opposition, which means their amplitudes rise in opposite directions. By proper shaping of auxiliary slots 134, one can achieve a very sharp reduction in cogging, as was already described above.

Figure 12:
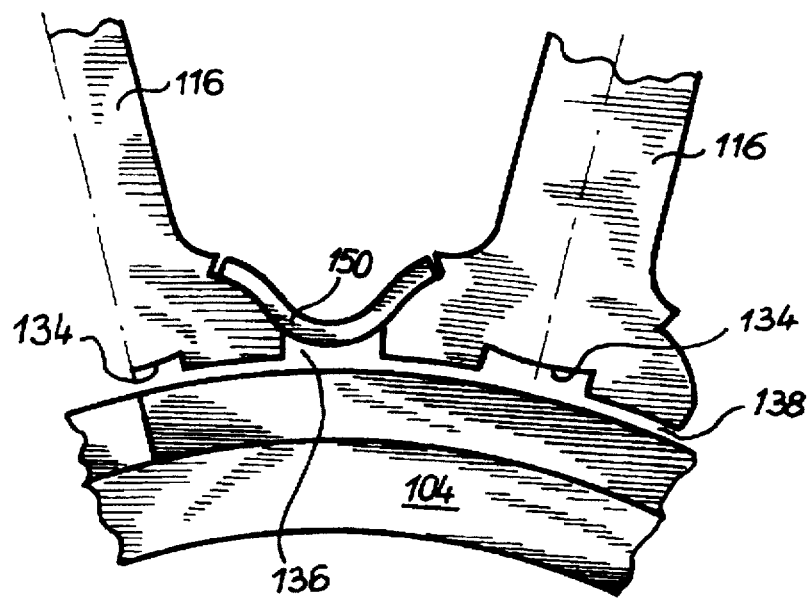
FIG. 12 illustrates a variant of the motor according to the second embodiment.

As shown in FIG. 12, a further improvement is possible if one provides, adjacent slot openings 136, i.e. in each of the openings of primary slots 1–12, a respective slot closure 150 of ferromagnetic material. Thereby, the air gap 138 adjacent slot openings 136 is made smaller, so that the structure of the stator becomes more symmetrical. One could also provide such slot closures 150 only on a portion of the slot openings, e.g. only on every second slot opening. In practice, it has been found, however, that when auxiliary slots 134 are properly laid out, such slot closures 150 are not necessary.

Figure 15:
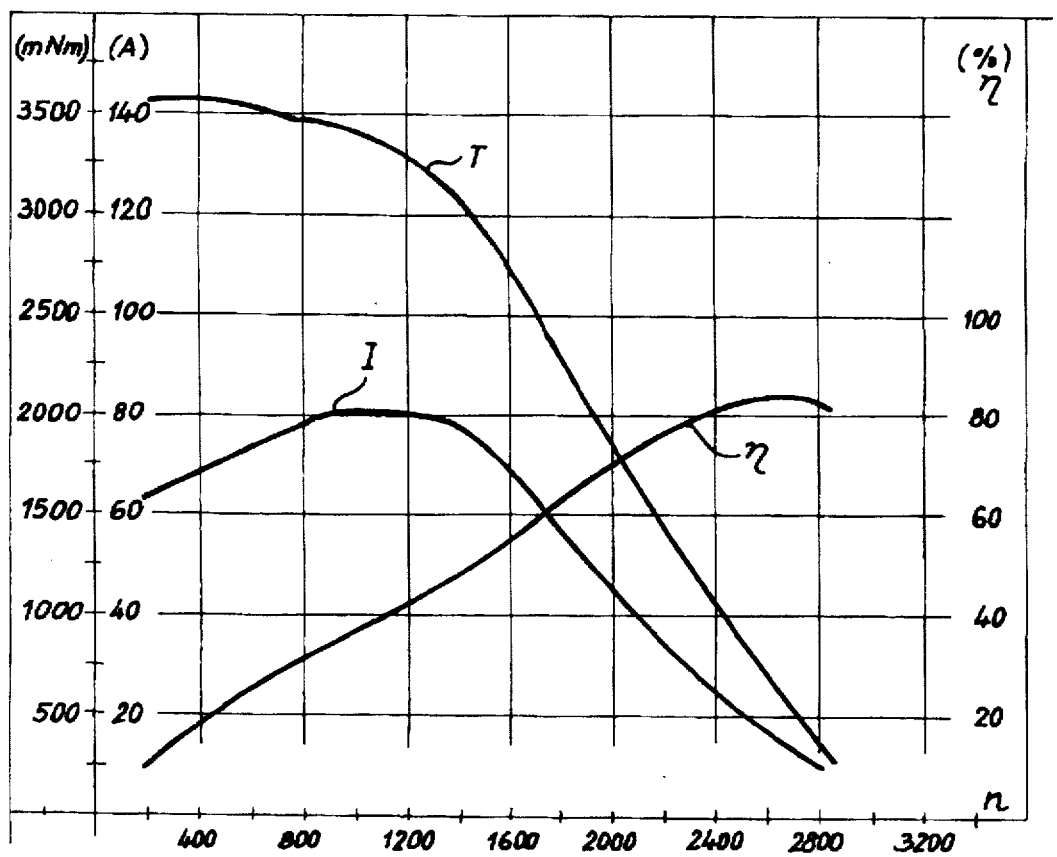
FIG. 15 is a graph showing characteristic values for the motor of FIG. 5, plotted with respect to rotation speed (RPM)

FIG. 15 sets forth the data on a motor constructed in accordance with FIGS. 5–14. As rotor magnets 98,99, neodymium magnets with a magnetic remanence of about 1 T are used, trapezoidally magnetized according to FIG. 1, and with pole boundaries 106, 108, 114 as shown in FIG. 6. The maximal torque T of such a motor is about 3.5 Nm, and the oscillations due to the reluctance torque Tr according to FIG. 15 amount to only about ±0.005 Nm, i.e. 0.15% thereof. In practice, this value is small enough to be neglected.

When running without load, this motor has a rotation speed of 2861 n with a current of 1.36 A (operating voltage: 12V). Upon loading, the rotation speed drops to 2723 n with a current of 12.9 A, a torque of 0.49 Nm, an input power of 163.7 W and an output power of 139.4 W, i.e. an efficiency of 85.1%. The important fact is, that the generated torque of this motor is extraordinarily even, although a slotted stator is used, and although, in the rotor, a trapezoidal magnetization with sharp pole boundaries is used.

THIRD EMBODIMENT

Figure 16:
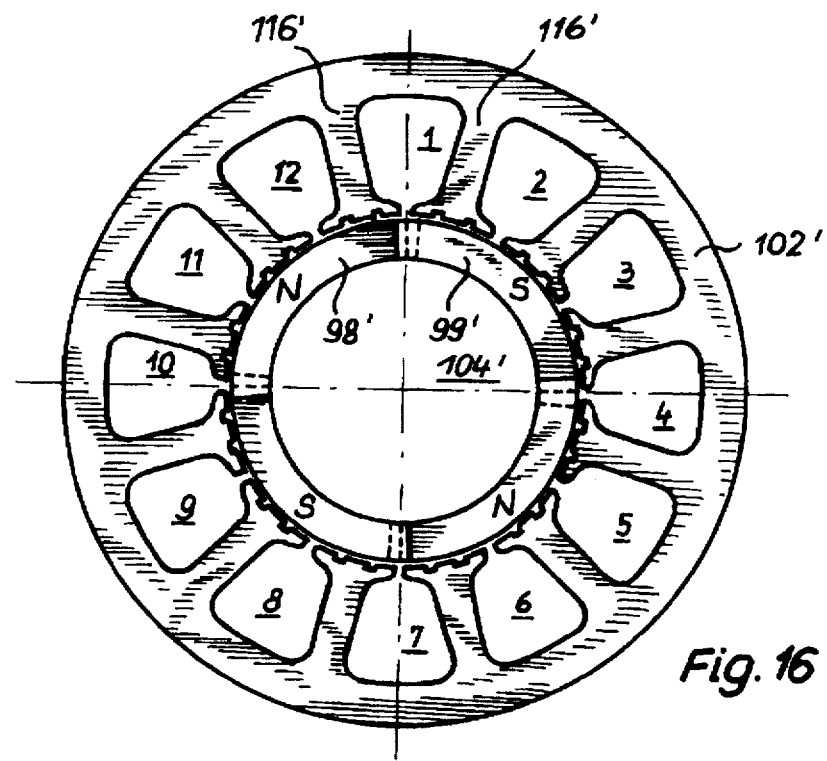
FIG. 16 illustrates a third embodiment of the invention.

FIG. 16 shows a third embodiment of the invention. This corresponds substantially to the previously-described embodiments; therefore, for identical or functionally equivalent components, the same reference numbers are used and these components are not again described.

The stator 102' here also has twelve main slots, which are designated 1–12 and which serve to accommodate windings, which can be structured the same as the winding 123 shown in FIG. 7.

Varying from the previous embodiments, the teeth 116' of stator 102' each have two auxiliary slots 160, 161, which along with main slots 136' are distributed evenly about the circumference of the stator. In total, stator 102' thus has here 36 slots, so that a slot interval of 7200.36=20° el. results. The width of auxiliary slots 160, 161 and of main slots 136' is about one third of this slot interval, i.e. only about 6.7° el. The advantage is that very narrow widths of the openings 136' of main slots 1–12 are possible, i.e. the air gap has a substantially homogeneous profile or curve.

The auxiliary slots 160, 161 can be constructed the same as those which were described with reference to FIG. 13. Their depth can also be determined experimentally in the same way.

Rotor 104' is magnetized the same as that shown in FIG. 1b, i.e. trapezoidally. In contrast to the previously-described embodiments, however, here three mutually relatively displaced pole boundaries 164, 166, and 168 are provided. They are displaced with respect to each other by about the width w of a slot opening 136 , i.e. by about a third of slot interval $t_N$, which means by 6.7° el; see FIG. 19a.

Figure 17:
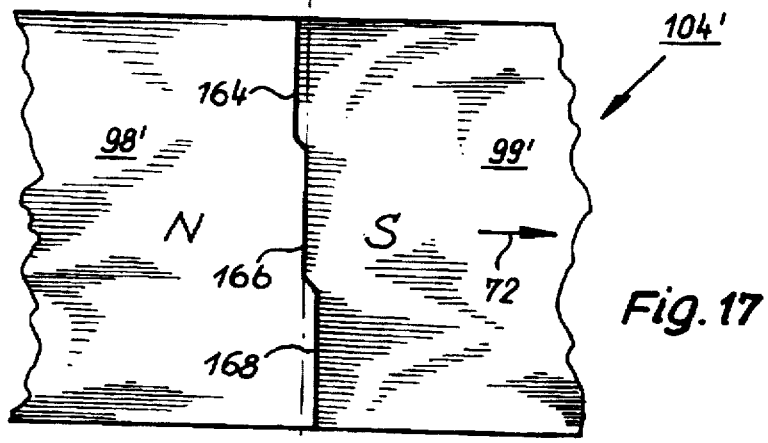
FIG. 17 illustrates a pole boundary for the FIG. 16 motor; the three other pole boundaries preferably have the same form.
Figure 18:
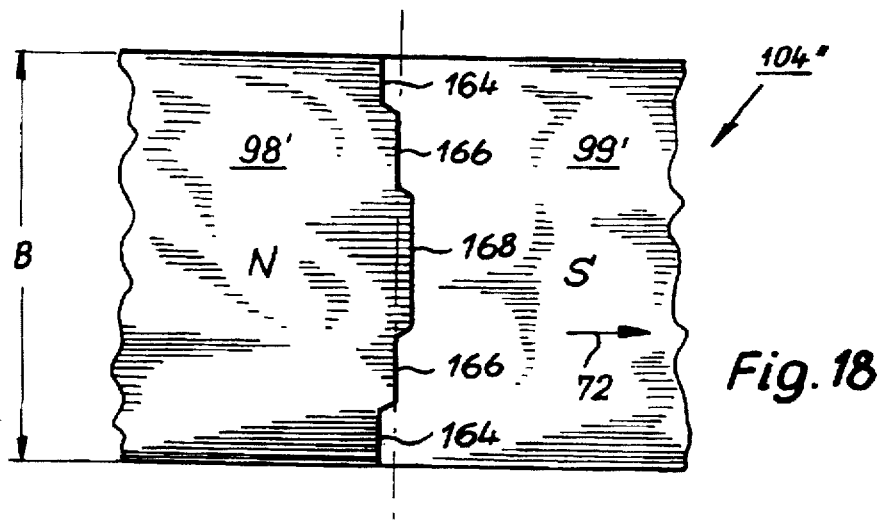
FIG. 18 illustrates a variant of FIG. 17, which has the advantage, with respect to FIG. 17, of better symmetry, whereby axial forces on the rotor are substantially avoided.

FIG. 17 illustrates a stair-stepped arrangement of the three pole boundaries 164, 166, and 168, which has the disadvantage that a magnetic force can be exerted in the axial direction on rotor 104'. FIG. 18 illustrates a symmetrical arrangement of these three pole boundaries, whereby an essentially arrow-shaped structure arises, in which the axial forces do not occur.

If the stair-stepped arrangement of pole boundary segments 164, 166, 168 in FIG. 18 were to be replaced by two diagonal pole boundaries (not shown), which together form an arrow-shaped structure, their inclination angle here would be approximately arcsin ($t_N$+B/2) where $t_N$ equals rotor circumference divided by the count of all slots, and B is the breadth of rotor 104" as shown in FIG. 18. In analogous fashion, for all other variants, the inclination angle can be calculated, and would, for example, be arcsin ($t_N$/B) for the FIG. 17 structure.

However, the version shown, with displaced, mutually parallel, pole boundary segments, seems to have significant advantages, compared to a version with inclined or diagonal pole boundaries.

The fact, that here the pole boundaries are displaced from each other by only a relatively small interval, affects advantageously the power of the motor, since the area of the displaced pole boundaries practically does not contribute to the torque of the motor, and the smaller this is, the greater is the power of the motor.

The mode of operation is best explained with reference to FIG. 19. The pole boundary 164 is symbolized in FIG. 19A by a black triangle 170, the pole boundary 166 by an open triangle 172, and the pole boundary 168 by a black dot 174.

Just as in the preceding figures, one recognizes that a symmetry position is present, when the black triangle 170 is found at one of the positions 0° el., 30° el., 60° el., 90° el., etc. At these positions, the reluctance torque 176 generated by pole boundary 164, has a zero crossover. Similarly, it has a zero crossover at about 10° el., 20° el., 30° el., 40° el., 50° el., 60° el., 70° el., 80° el., 90° el., etc. The curve is shown in the FIG. 19b graph.

The form of reluctance torque 176 deviates here, as shown, substantially from a sinusoidal form. This is a consequence of the fact that, e.g. in the range from 14° el. to 26° el., the air gap 138 is practically constant; thus, only a small reluctance torque results. Since pole boundary 166 is displaced relative to pole boundary 164 by 6.7° el., the reluctance torque 178 created by this pole boundary 166 has a phase position (shown in FIG. 19b), relative to reluctance torque 176, which is shifted rightward by 6.70 el. Equally, the reluctance torque 180 created by pole boundary 168 has the phase position shown in FIG. 19b, i.e. again shifted rightward by 6.7° el.

Looking at FIG. 19b, one immediately recognizes that the three reluctance torques 176, 178, 180 essentially cancel each other. In the third embodiment this is the basis or principle for the suppression of cogging, i.e. the three reluctance torques superimpose in such a manner that their sum essentially equals zero. The relative displacement of these three reluctance torques is about (in radians) $2\pi/3$, analogous to a three-phase alternating current system.

FOURTH EMBODIMENT

Figure 19:
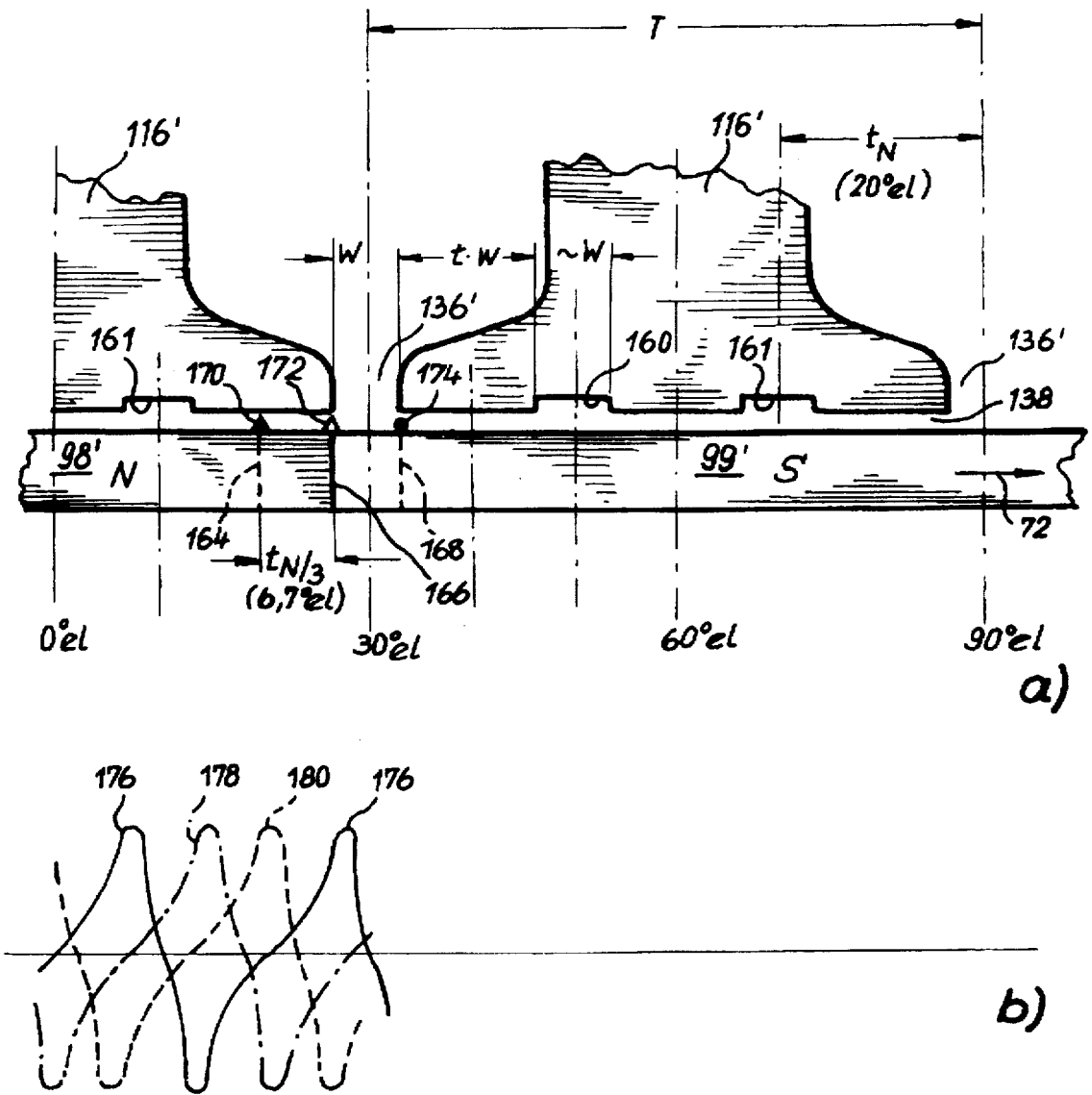
FIG. 19 is another combination 19(a) schematic and 19(b) torque trace diagram, explaining the motor of the third embodiment.

FIGS. 20–21 illustrate a fourth embodiment of the invention, in schematic form, analogous to FIG. 4, FIG. 11, or FIG. 19. The stator teeth 116" are also each provided with two auxiliary slots 185, 186 or 185', 186', whose width corresponds to the width W of the opening 136" of a main slot. This width W is greater than half of a slot interval $t_N$; therefore, here the distance d between two displaced pole boundary segments corresponds approximately to the smallest discontinuity distance DD between a positive discontinuity 188 and a negative discontinuity 190, i.e. the displacement d between pole boundaries is not specified by the width W of a slot opening, but rather by the width DD of stator iron 189 between two slot openings, e.g. between the auxiliary slots 185' and 186'.

Figure 24:
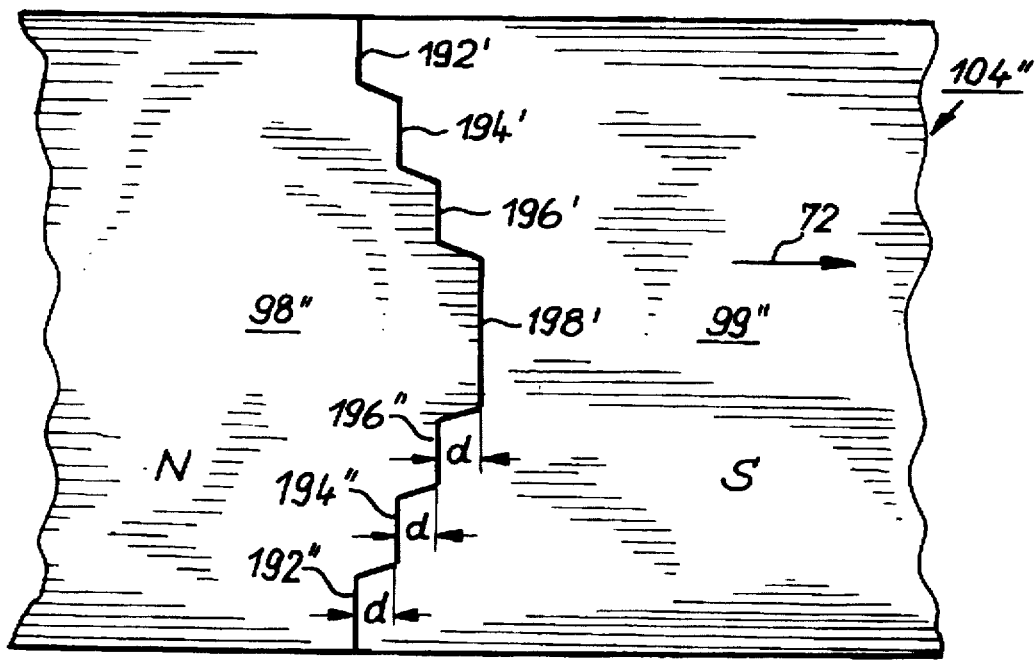
FIG. 24 illustrates a symmetrical implementation of the pole boundary for the motor of FIG. 20; the other pole boundaries, not shown, of this rotor 104" preferably have the same form.

Rotor 104" has here four mutually displaced pole boundary segments 192, 194, 196, 198, which can be arranged step-shaped according to FIG. 21 or, analog to FIG. 18, essentially arrow-shaped, as shown in FIG. 24. This step-shaped pole boundary separates the north pole 98" shown from the south pole 99" shown, the interval between the displaced segments being each d, corresponding approximately to the value DD.

In FIG. 24, connected symmetrically to the central pole boundary segment 198' are two segments 196', 196" displaced by the interval d. To these are connected symmetrically two segments 194', 194" displaced by the interval d and, in turn, to these are connected symmetrically two more segments 192', 192" displaced by the interval d. It does not matter whether the "arrow" of this arrow-shaped arrangement points in the direction of rotation or counter to rotation direction; i.e. the invention is equally adapted for both rotation directions, which directly results from the symmetry of the arrangement.

As shown in FIG. 20b, hereby arise a total of four displaced reluctance torques. Since the course of the air gap 138 deviates sharply from a sinusoidal form, the form of the reluctance torques also deviates sharply from a sinusoidal form, as FIG. 20b indicates.

Figure 23:
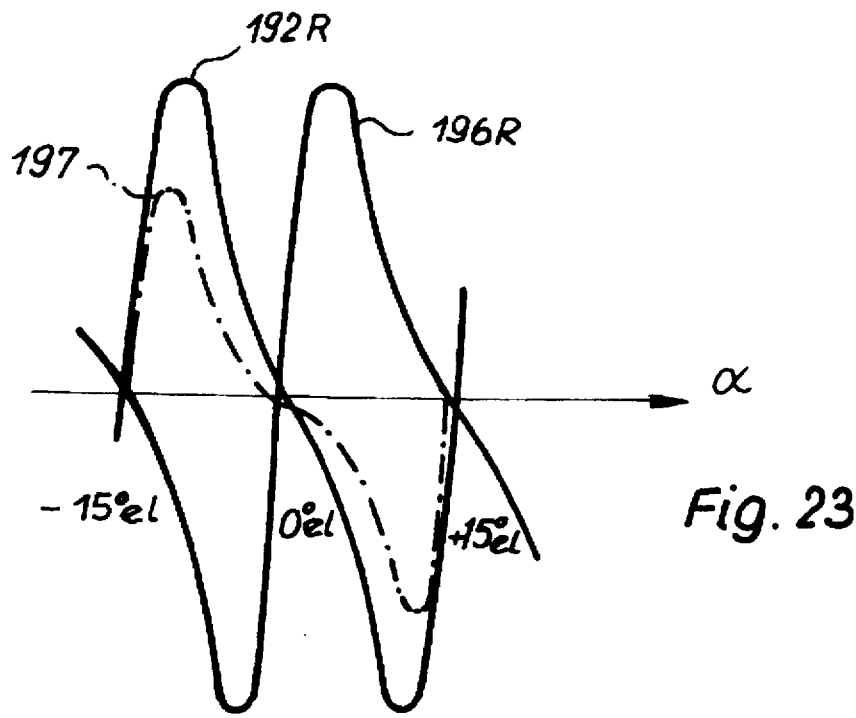
FIG. 23 is a graph which explains the FIG. 20 embodiment.

In FIG. 20b, the reluctance torque generated by pole boundary segment 192 is designated as 192R. It has zero crossovers at −15° el., 0° el., 15° el., 30° el., etc. Its positive maximum is at about −10° el. and its negative maximum is at about +10° el. The reluctance torque created by segment 194 is designated in FIG. 20b as 194R and, analogously, the torques 196R and 198R for segments 196, 198 of the pole boundaries. The reluctance torques 194R etc. are displaced with respect to torque 192R by the respective values d=DD, 2 d, or 3 d, where d here equals about 5° el and is equal to W/3. As FIG. 23 shows, the torques 192R, 196 run counterphased to each other but, due to their asymmetrical form, do not cancel each other out, i.e. upon their superposition, there arises a not insignificant cogging 197; see FIG. 23. If one uses, by contrast, four reluctance torques, as shown in FIG. 20, the cogging is more strongly suppressed, and the remaining reluctance torque has a higher frequency, as though the stator had about fourfold as many slots, i.e. in the present case, 144 slots. In practice, such a residual torque disturbs nothing.

Figure 22:
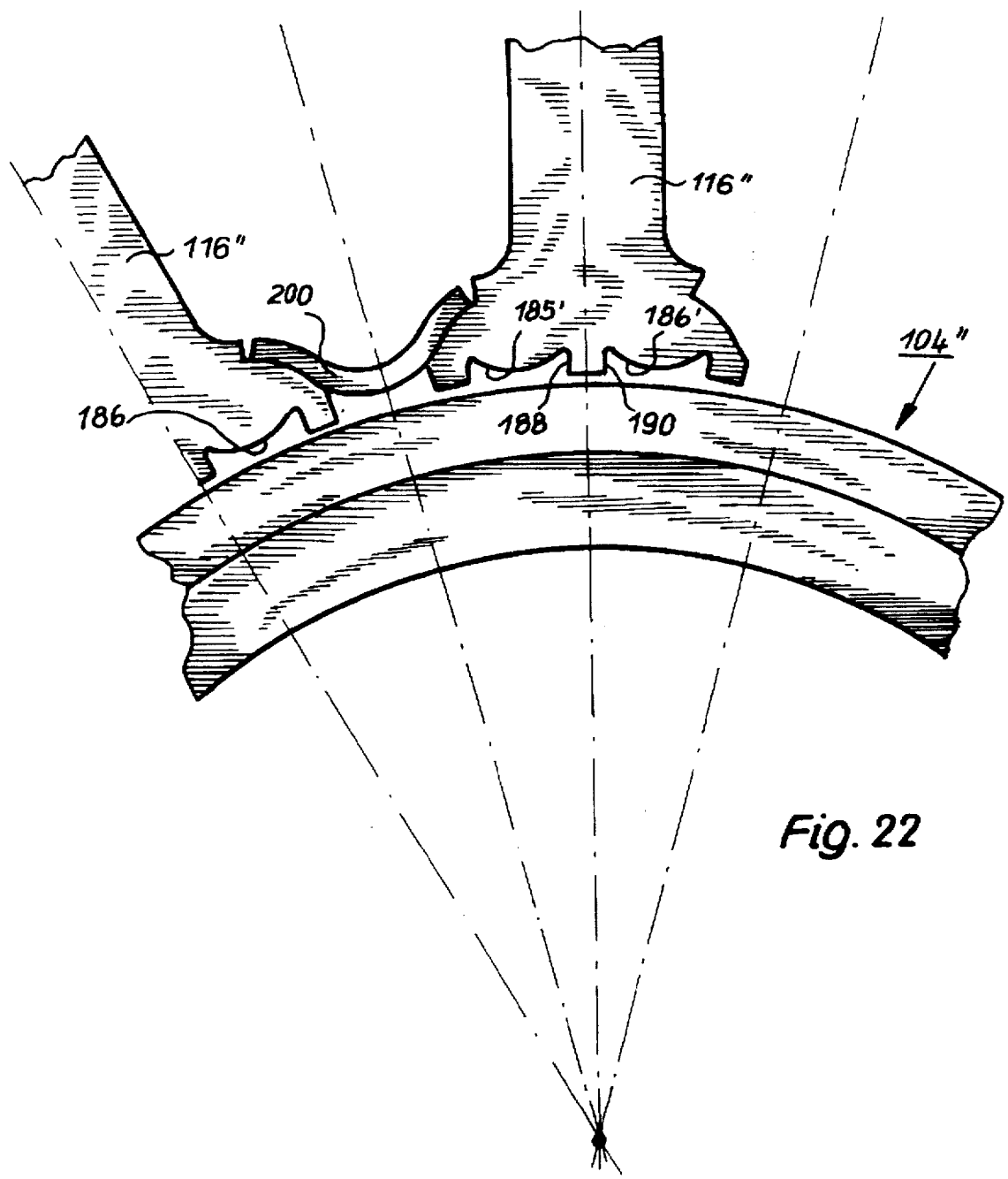
FIG. 22 illustrates a variant to the embodiment of FIG. 20.

FIG. 22 shows a variant, analogous to FIG. 12, with a slot closure 200 of ferromagnetic material. Such a slot closure is advantageously placed on all slot openings and reduces the cogging further. However, experience has shown that the present invention essentially makes the use of such slot closures superfluous, which substantially reduces the cost of making such a motor.

For the case that the slot openings have a width which corresponds to, at most, half of a slot interval, there results the following formula for the quantity W/T:

$$W/T = (1 + r(h+1) + h)^{-1} \tag{1}$$

where h=count of auxiliary slots per stator tooth t=count of displaced pole boundary segments minus 1. For example, in FIG. 3, the value t=1, just as in FIG. 6. For FIG. 17 and FIG. 18, t=2.
Various values for this alternative:

| t | h | W/T | Remarks |
|---|---|-----|---------|
| 1 | 0 | 0.5 | (see FIG. 2) |
| 2 | 0 | 0.33 | |
| 1 | 1 | 0.25 | (see FIG. 5) |
| 2 | 1 | 0.17 | |
| 1 | 2 | 0.17 | |
| 2 | 2 | 0.11 | (see FIG. 16) |
| 3 | 0 | 0.25 | |
| 3 | 1 | 0.125 | |

STATORS WITH WIDE AUXILIARY SLOTS

If the width of a slot opening is greater than half of a slot interval $t_N$, one must substitute, for t in the above formula, the reciprocal value of (number Q of displaced pole boundary segments−1). E.g., in FIGS. 21 or 24, Q=4 displaced pole boundary segments are provided; therefore Q−1=3. The reciprocal thereof i.e. $t=(Q-1)^{-1}$ is therefore ⅓. Thereby, when h=2, from formula (1), there results a quantity W/T= 0.25. This results in a very desirable solution, since in the motor according to FIG. 21 or FIG. 22, the loss of usable rotor magnetic flux (through the displaced pole boundaries, as previously described) is particularly small. With only three displaced pole boundaries, i.e. Q=3 or t=½, and two auxiliary slots per stator tooth, i.e. h=2, there results, analogously for W/T, the quantity 0.222 for an optimal cancellation of the cogging.

If one selects the count h of auxiliary slots per stator tooth correspondingly high, one can always select a factor t which is smaller than 1, so that the ratio W/T is selectable within wide limits, depending upon the requirements in practice. The limits lie in the actual manufacturability of the stator laminations required for the stator, and of the magnetization of the rotor.

Naturally, within the scope of the inventive concept, numerous further variations and modifications are possible, beyond the variants described. For example, features of one embodiment may be combined with features of another embodiment. Therefore, the invention is not limited to the particular embodiments described, but rather is defined by the following claims.

What is claimed is:

1. A method of reducing the reluctance torque known as "cogging torque" in a motor which has a slotted stator and a permanent magnet rotor, the rotor having, in the middle of each pole, a region of essentially constant magnetic flux density, comprising the steps of:
   a) generating in the motor a second reluctance torque having approximately the same characteristic shape as the cogging torque but being phase-displaced with respect to it in radians by ⅔ π;
   b) generating in the motor a third reluctance torque having approximately the same characteristic shape as the cogging torque but being phase-displaced with respect to it in radians by 4/3 π; and
   c) superimposing the second and third reluctance torques on said cogging torque in order, by this superposition, to minimize said cogging torque, at least within a predetermined rotational range.

2. An electronically commutated electric motor with a stator core having a lamination stack of ferromagnetic material and a permanent-magnet rotor (104), said lamination stack and said rotor defining therebetween an air gap, wherein an air-gap-adjacent surface of said lamination stack is formed with a plurality of slots, each pole boundary between two adjacent rotor poles is subdivided into a plurality of parallel pole boundary segments (106, 108; 114) displaced with respect to each other, thereby defining pole boundary segments of a first kind and pole boundary segments of a second kind; and the spacing between said parallel pole boundary segments of said first and second kinds is so selected that a first reluctance torque (140), resulting from interaction, during rotor turning, of a first rotor portion having pole boundary segments (106, 108) of said first kind, with the slotting of the stator (102), runs essentially in phase opposition to a second reluctance torque (148), resulting from interaction, during rotor turning, of another rotor portion (104B), having pole boundary segments of said second kind (114), with the slotting of the stator.

3. The electric motor according to claim 2, wherein lengths of said pole boundary segments are so selected that said first reluctance torque and said second reluctance torque have amplitudes which are of the same order of magnitude.

4. The electric motor according to claim 2, wherein slotting of said stator lamination stack is at identical intervals, and angular displacement (W) between two adjacent pole boundary segments of said rotor corresponds to about half the interval (T) between adjacent stator slots.

5. The electric motor according to claim 2, wherein said stator has a plurality of teeth (116) and said teeth are formed with respective auxiliary slots, the side walls of an auxiliary slot being connected by a portion of said tooth presenting a convex surface (134''') to said air gap (138).

6. The electric motor according to claim 5, wherein a maximum depth of said auxiliary slots is less than 1 mm.

7. The electric motor according to claim 6, in which said maximum death is within a range from about 0.4 mm to about 0.7 mm.

8. The electric motor according to claim 5, wherein the death of an auxiliary slot, extending from a side wall thereof, decreases to a minimum at said convex surface.

9. The electric motor according to claim 8, wherein said minimum lies in a central region between the side walls of an auxiliary slot.

10. The electric motor according to claim 5, wherein said auxiliary slot has an essentially symmetrical cross-section.

11. An electronically commutated motor with a permanent-magnet rotor, and a stator core having a lamination stack of ferromagnetic material and a permanent-magnet rotor (104), said lamination stack and said rotor defining therebetween an air gap, wherein an air-gap-adjacent surface of said lamination stack is formed with a plurality of slots, each pole boundary between two adjacent rotor poles is subdivided into a plurality of mutually parallel pole boundary segments displaced with respect to each other, thereby defining pole boundary segments of a first kind, a second kind and of a third kind; and the spacing between adjacent parallel pole boundary segments of said first, second and third kinds is so selected that respective reluctance torques, resulting from interaction, during rotor turning, between said pole boundary segments and slots of said stator lamination stack, superpose to form a reduced total reluctance torque.

12. The electronically commutated motor according to claim 11, wherein three mutually displaced pole boundary segments are used, and each two adjacent pole boundary segments are displaced by a distance which is about one-third of a stator slot width.

13. The electronically commutated motor according to claim 11, wherein the stator lamination stack is formed with stator teeth separated by slots and the number of stator teeth is integer-divisible by the number of rotor poles.

14. The electronically commutated motor according to claim 11, wherein said stator core is slotted, thereby defining a plurality of teeth, said teeth being formed with a shallow recess serving as an auxiliary slot.

15. An electronically commutated electric motor having a stator and a rotor, defining between them an air gap;
   said stator being on a first side of said air gap and said rotor being on a second side of said air gap;
   a gap-facing surface of said stator being formed with slots, said slots causing variation in size of said air gap, said air gap varying within a small rotational angle from a lesser value to a greater value,
   such variation being defined as a positive discontinuity,
   said air gap then varying within a small rotational angle from a greater value to a lesser value, such variation being defined as a negative discontinuity;
   a positive discontinuity being separated from an adjacent negative discontinuity by a distance called a discontinuity distance;
   said rotor having a plurality of magnetic poles with essentially trapezoidal magnetization, said poles being separated by pole boundaries;
   wherein, at each transition between two adjacent rotor poles, a pole boundary comprises at least two boundary segments which are displaced from each other, in the rotation direction of said rotor, by a distance approximately corresponding to one discontinuity distance or an integer multiple thereof.

16. The electronically commutated motor according to claim 15, wherein the displacement between said two successive pole boundary segments is within a range between 0.9 times said discontinuity distance and 1.1 times said discontinuity distance.

17. The electronically commutated motor according to claim 15, wherein
   width (B) of openings of said slots is uniform, and a quotient of said width (B) divided by said discontinuity distance (DD), or the reciprocal thereof, is essentially equal to an integer.

18. The electronically commutated motor according to claim 17, wherein
   the discontinuity distance corresponds to at least essentially the width of a slot opening, and
   the number of pole boundary segments, displaced with respect to each other, is two.

19. The electronically commutated motor according to claim 17, wherein
   the discontinuity distance is less than the width of said slot opening, and
   the number of pole boundary segments, displaced with respect to each other, is equal to an integer-rounded value of slot width divided by discontinuity distance, incremented by the integer 1.

20. The electronically commutated motor according to claim 2, wherein
   said stator lamination stack is formed with stator teeth separated by slots, and the number of stator teeth is integer-divisible by the number of rotor poles.

21. The electronically commutated motor according to claim 2, wherein
   the pole boundary segments, displaced with respect to each other, extend essentially parallel to the structures, on the air-gap-adjacent surface of said stator, which cause said discontinuities.

22. The electronically commutated motor according to claim 2, wherein
   said stator is slotted, thereby defining a plurality of teeth, each of said teeth being formed with a shallow recess which serves as an auxiliary slot (134).

23. The electronically commutated motor according to claim 22, wherein
   said stator has primary slots (136), adapted to receive windings, and said auxiliary slots (134), and
   said primary and auxiliary slots are evenly spaced, thereby defining an essentially constant slot interval $(t_N)$.

24. The electronically commutated motor according to claim 22, wherein
   said auxiliary slots (134) formed on said teeth have a ratio of width to average depth of more than two.

25. The electronically commutated motor according to claim 21, wherein
   at least some, of the plurality of teeth defined by slots in said stator, are each formed with a plurality h of auxiliary slots; and
   a ratio of slot width (W), of said slots defining said teeth to a slot interval (T) between winding-receiving slots (136) is specified by the following formula:

$$W/T = (1 + t(h+1) + h)^{-1}$$

where
   t = count of displaced pole boundary segments minus 1, and
   h = count of auxiliary slots per stator tooth.

26. The electronically commutated motor according to claim 2, wherein (FIG. 22)
   said stator has a plurality of slots (136) and the openings of at least some of said slots are closed by slot closures (200) of soft-ferromagnetic material.

27. The electronically commutated motor according to claim 26, wherein said slot closures (200) each have a central region which has a smaller spacing, from the rotor, than do portions of said slot closure outside said central region.

28. The electronically commutated motor according to claim 2, wherein (FIG. 24)
   the pole boundary segments, displaced with respect to each other, in a plan view of the rotor circumference, define an essentially arrow-shaped pattern.

29. The electronically commutated motor according to claim 2, wherein
   transitions interconnecting adjacent boundary segments displaced with respect to each other are inclined with respect to said boundary segments.

30. The electronically commutated motor according to claim 2, wherein three phase windings are provided on said stator core.

31. The electronically commutated motor according to claim 30, wherein said phase windings are delta-connected and pitched.

32. The electronically commutated motor according to claim 31, wherein the rotor magnet is trapezoidally magnetized and the pitch is selected to reduce the third harmonic of the induced voltage.

33. The electronically commutated motor according to claim 30, wherein the coil width of a phase winding is about 120° el.

34. The electronically commutated motor according to claim 2, wherein the width (W) of a slot opening is greater than half a slot interval ($t_N$), said slot interval being calculated by a calculation which takes into account any auxiliary slots, a ratio of slot width W of winding-receiving main slots to a spacing T between said main slots is specified by the formula:

$$W/T = (1 + t(h+1) + h)^{-1}$$

where t=reciprocal of (number Q of displaced pole boundary segments minus 1), thus $t=(Q-1)^{-1}$ and H=number of auxiliary slots per stator tooth.

35. A method of making a low-cogging electric motor comprising a ferromagnetic stator core formed with slots for receiving windings, each stator tooth defined by said slots being formed with at least one auxiliary slot;

further comprising a permanent-magnet rotor separated from said stator by an air gap, poles of said rotor being separated by pole boundaries, each pole boundary comprising a plurality of contiguous boundary segments connected end-to-end to each other, each pair of adjacent pole boundaries being displaced from each other in a circumferential direction of said rotor by a predetermined angular interval, said method comprising the steps of:

a) measuring the characteristic curve of reluctance torque occurring during turning of said rotor relative to said stator;

a) removing, from an air-gap-adjacent surface of said stator teeth, a layer of predetermined thickness, thereby reducing depth of said auxiliary slots;

b) again measuring the characteristic curve of reluctance torque occurring within the thus-modified stator during turning of the rotor; and c) repeating the foregoing steps until a characteristic curve of a predetermined desired form is achieved.

* * * * *

UNITED STATES PATENT AND TRADEMARK OFFICE
CERTIFICATE OF CORRECTION

PATENT NO : 5,757,100
DATED : May 26, 1998
INVENTOR(S) : Martin Burgbacher

It is certified that error appears in the above-identified patent and that said Letters Patent is hereby corrected as shown below:

On the title page, [56],

"References Cited" should include 5 U.S. patents and 13 other references listed on PTO-1449 attached to Paper #5, namely:

| | | |
|---|---|---|
| 3,631,272 | 12/71 | Kirii........310/10 |
| 4,672,253 | 06/87 | Tajima.......310/269 |
| 4,933,584 | 06/90 | Harms........310/162 |
| 5,170,083 | 12/92 | Burgbacher...310/51 |

FOREIGN PATENT DOCUMENTS

| | | |
|---|---|---|
| 1 535 498 | 07/68 | France |
| 17 63 769 | 01/72 | Germany |
| 37 00 774-A1 | 08/87 | Germany |
| 37 23 099-A1 | 01/89 | Germany |
| 2-106152 | 04/90 | Japan |
| 0 375 228-A1 | 06/90 | European Pat. Off. |
| 40 02 714-A1 | 08/90 | Germany |
| 41 24 425-A1 | 01/92 | Germany |
| 0 536 113 B1 | 04/93 | European Pat. Off. |
| G 91 92 750.0 | 08/92 | Germany |

UNITED STATES PATENT AND TRADEMARK OFFICE
CERTIFICATE OF CORRECTION

PATENT NO : 5,757,100
DATED : May 26, 1998
INVENTOR(S): Martin Burgbacher

It is certified that error appears in the above-identified patent and that said Letters Patent is hereby corrected as shown below:

OTHER DOCUMENTS

B. Ackerman, et al., "Analytical modeling of the cogging torque in permanent magnet motors," in *Electrical Engineering*, Vol. 78, pp. 117-125 (Springer-Verlag, 1995).

Patent Abstracts of Japan, Vol. 14, No. 320, 1990 (E-950), abstracting JP 2-106 152, TANAKA/MITSUBISHI.

Derwent WPI English abstract of DE 40 02 714, LEUTNER/ZAHNRADFABRIK FRIEDRICHSHAFEN.

At column 6, line 4, "especially" should be --essentially--.

At column 7, line 19, "," after 56% should be deleted.

At column 9, line 7, "TF: should be --$T_F$--.

At column 10, line 20, "Tr" should be --$T_r$--.

At column 10, line 64, "136" should be --136'--.

At column 11, line 47, "6.70" should be 6.7°--.

At column 14, claim 7, line 39, "death" should be --depth--.

At column 14, claim 8, line 42, "death" should be --depth--.

At column 16, claim 21, lines 8 and 9, "which cause" should be --causing--.

UNITED STATES PATENT AND TRADEMARK OFFICE
CERTIFICATE OF CORRECTION

PATENT NO : 5,757,100
DATED : May 26, 1998
INVENTOR(S) : Martin Burgbacher

It is certified that error appears in the above-identified patent and that said Letters Patent is hereby corrected as shown below:

At column 16, claim 22, line 12, after "stator" insert --core--.

At column 16, claim 22, line 14, "which serves" should be --serving--.

Signed and Sealed this

Twenty-second Day of June, 1999

Attest:

Q. TODD DICKINSON

Attesting Officer

Acting Commissioner of Patents and Trademarks